US009180640B2

(12) United States Patent
Masanek, Jr. et al.

(10) Patent No.: US 9,180,640 B2
(45) Date of Patent: Nov. 10, 2015

(54) METHOD OF MAKING A FLOOR TILE WITH OVERMOLDED PADS

(71) Applicants: Frederick W. Masanek, Jr., Barrington, IL (US); Thomas Malewig, Sugar Grove, IL (US); David S. Iverson, Chicago, IL (US); Allan R. Thom, Clarendon Hills, IL (US)

(72) Inventors: Frederick W. Masanek, Jr., Barrington, IL (US); Thomas Malewig, Sugar Grove, IL (US); David S. Iverson, Chicago, IL (US); Allan R. Thom, Clarendon Hills, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 425 days.

(21) Appl. No.: 13/705,250

(22) Filed: Dec. 5, 2012

(65) Prior Publication Data

US 2013/0093115 A1    Apr. 18, 2013

Related U.S. Application Data

(60) Continuation-in-part of application No. 12/609,959, filed on Oct. 30, 2009, now Pat. No. 8,535,785, and a continuation-in-part of application No. PCT/US2010/054515, filed on Oct. 28, 2010, which is (Continued)

(51) Int. Cl.
*B29D 99/00* (2010.01)
*E01C 5/22* (2006.01)
(Continued)

(52) U.S. Cl.
CPC ............ *B29D 99/0057* (2013.01); *E01C 5/226* (2013.01); *E01C 13/045* (2013.01); *E04F 15/02172* (2013.01); *E04F 15/105* (2013.01);

(Continued)

(58) Field of Classification Search
CPC  B29D 99/0057; B29C 44/1271; B29C 70/72; B29C 70/747; B29C 45/1671; B29C 45/1615; B29C 45/1675; B29C 45/1679; B29C 45/1676; B29C 2045/0089; B29C 2045/167; B29C 2045/1673; B29C 2045/1681; B29C 2045/1678
USPC ........................................................ 264/255
See application file for complete search history.

(56) References Cited

U.S. PATENT DOCUMENTS

| 348,782 A | 9/1886 | Sawyer |
| 1,925,271 A | 9/1933 | Miller |

(Continued)

FOREIGN PATENT DOCUMENTS

| EP | 1077297 A2 | 2/2001 |
| EP | 1418290 A1 | 12/2004 |

(Continued)

OTHER PUBLICATIONS

Japanese Patent Office, Notification of Reasons of Refusal issued for Japanese Patent Application No. 2012-537069 on Jun. 24, 2014.

(Continued)

*Primary Examiner* — Timothy Kennedy

(74) *Attorney, Agent, or Firm* — Perkins IP Law Group LLC; Jefferson Perkins

(57) ABSTRACT

A plastic floor tile is formed by molding a body of a first polymer compound and overmolding features onto the body from a second polymer compound. The compounds may be different from each other in hardness and/or color. The overmolded features may include raised pads on the upper surface of the tile. The pads on the upper surface may be injection-molded from the lower surface through through-holes, which are smaller in area than the area of the pads.

2 Claims, 25 Drawing Sheets

Related U.S. Application Data a continuation-in-part of application No. 12/609,959, filed on Oct. 30, 2009, now Pat. No. 8,535,785, application No. 13/705,250, which is a division of application No. 13/217,556, filed on Aug. 25, 2011, now Pat. No. 8,993,098.

(51) Int. Cl.
*E01C 13/04* (2006.01)
*E04F 15/02* (2006.01)
*E04F 15/10* (2006.01)

(52) U.S. Cl.
CPC ......... *E01C 2201/12* (2013.01); *E01C 2201/16* (2013.01); *E04F 2201/0146* (2013.01); *E04F 2201/021* (2013.01)

(56) References Cited

U.S. PATENT DOCUMENTS

| | | | |
|---|---|---|---|
| 3,354,249 A | 11/1967 | Morin | |
| 3,699,926 A | 10/1972 | Stockl | |
| 3,909,996 A | 10/1975 | Ettlinger, Jr. et al. | |
| 3,946,529 A | 3/1976 | Chevaux | |
| 4,054,987 A | 10/1977 | Forlenza | |
| 4,111,585 A | 9/1978 | Mascaro | |
| 4,169,339 A | 10/1979 | See | |
| 4,436,779 A | 3/1984 | Menconi et al. | |
| 4,590,731 A | 5/1986 | DeGooyer | |
| 4,810,559 A | 3/1989 | Fortier et al. | |
| 4,860,510 A | 8/1989 | Kotler | |
| 4,930,286 A | 6/1990 | Kotler | |
| 5,171,619 A | 12/1992 | Reuben | |
| 5,364,204 A | 11/1994 | MacLeod | |
| 5,628,160 A | 5/1997 | Kung | |
| 5,950,378 A | 9/1999 | Council et al. | |
| 5,992,106 A | 11/1999 | Carling et al. | |
| 6,098,354 A | 8/2000 | Skandis | |
| 6,221,298 B1 | 4/2001 | Ferreira et al. | |
| 6,233,776 B1 | 5/2001 | Blum et al. | |
| 6,264,869 B1 | 7/2001 | Notarpietro et al. | |
| 6,372,323 B1 | 4/2002 | Kobe et al. | |
| 6,451,400 B1 | 9/2002 | Brock et al. | |
| 6,531,203 B2 | 3/2003 | Kessler et al. | |
| 6,562,271 B2 | 5/2003 | Hiraoka et al. | |
| 6,564,397 B1 | 5/2003 | Hawley et al. | |
| 6,622,440 B2 | 9/2003 | Mercade | |
| 6,623,840 B2 | 9/2003 | Hainbach | |
| 6,751,912 B2 | 6/2004 | Stegner et al. | |
| 6,802,159 B1 | 10/2004 | Kotler | |
| 6,926,856 B2 | 8/2005 | Hus et al. | |
| 6,966,155 B2 | 11/2005 | Nevison | |
| 6,969,548 B1 | 11/2005 | Goldfine | |
| 7,114,298 B2 | 10/2006 | Kotler | |
| 7,291,378 B2 | 11/2007 | Cowelchuk et al. | |
| 7,299,592 B2 | 11/2007 | Moller, Jr. | |
| 7,507,362 B2 | 3/2009 | Moller, Jr. | |
| 7,517,483 B2 | 4/2009 | Dalla Valle | |
| 7,571,572 B2 | 8/2009 | Moller, Jr. | |
| 7,571,573 B2 | 8/2009 | Moller, Jr. | |
| 7,587,865 B2 | 9/2009 | Moller, Jr. | |
| 7,610,731 B1 | 11/2009 | Collison | |
| 7,636,960 B2 | 12/2009 | Hawley et al. | |
| 7,690,160 B2 | 4/2010 | Moller, Jr. | |
| 7,757,449 B2 | 7/2010 | Portoles Ibanez et al. | |
| 7,908,802 B2 | 3/2011 | Frederiksen | |
| 7,918,057 B2 | 4/2011 | Moller, Jr. | |
| 8,037,648 B2 | 10/2011 | Vanderhoef | |
| 8,146,319 B2 | 4/2012 | McIntosh et al. | |
| 8,161,708 B2 | 4/2012 | Schacht et al. | |
| 8,166,722 B2 | 5/2012 | Moller, Jr. | |
| 8,230,654 B2 | 7/2012 | McIntosh et al. | |
| 8,266,857 B2 | 9/2012 | David | |
| 8,341,896 B2 | 1/2013 | Moller, Jr. et al. | |
| 8,397,466 B2 | 3/2013 | Jenkins et al. | |
| 8,407,951 B2 | 4/2013 | Haney et al. | |
| 8,439,596 B1 | 5/2013 | Dvoracek | |
| 8,458,974 B2 | 6/2013 | McIntosh et al. | |
| 8,658,269 B1 | 2/2014 | Parkes et al. | |
| 8,782,989 B2 | 7/2014 | Tang | |
| 2002/0124506 A1 | 9/2002 | Mercade | |
| 2003/0044591 A1 | 3/2003 | Hsieh | |
| 2004/0226241 A1 | 11/2004 | Forster et al. | |
| 2004/0226244 A1 | 11/2004 | Graab et al. | |
| 2004/0258869 A1 | 12/2004 | Walker | |
| 2005/0016097 A1 | 1/2005 | Janesky | |
| 2005/0183370 A1 | 8/2005 | Cripps | |
| 2005/0193669 A1 | 9/2005 | Jenkins et al. | |
| 2005/0252109 A1 | 11/2005 | Fuccella et al. | |
| 2006/0070314 A1 | 4/2006 | Jenkins et al. | |
| 2006/0127647 A1 | 6/2006 | Thrush | |
| 2006/0185287 A1 | 8/2006 | Glazer et al. | |
| 2006/0272252 A1 | 12/2006 | Moller, Jr. | |
| 2006/0283118 A1 | 12/2006 | Moller, Jr. | |
| 2007/0184248 A1 | 8/2007 | Pai | |
| 2008/0118703 A1 | 5/2008 | Sansano Marti | |
| 2008/0127593 A1 | 6/2008 | Janesky | |
| 2008/0229625 A1* | 9/2008 | Frasson et al. | 36/59 C |
| 2008/0229697 A1 | 9/2008 | Bosman et al. | |
| 2009/0031658 A1 | 2/2009 | Moller, Jr. et al. | |
| 2009/0047451 A1 | 2/2009 | Huss et al. | |
| 2009/0139159 A1 | 6/2009 | Hill | |
| 2009/0139160 A1 | 6/2009 | Hill | |
| 2009/0282769 A1 | 11/2009 | Moller, Jr. | |
| 2010/0005757 A1 | 1/2010 | Collison | |
| 2010/0021718 A1 | 1/2010 | Vos et al. | |
| 2010/0236176 A1 | 9/2010 | Jenkins et al. | |
| 2011/0056158 A1 | 3/2011 | Moller, Jr. et al. | |
| 2011/0076457 A1 | 3/2011 | Reichwein et al. | |
| 2011/0104434 A1 | 5/2011 | Masanek, Jr. et al. | |
| 2012/0085043 A1 | 4/2012 | Jenkins et al. | |
| 2013/0047528 A1 | 2/2013 | Masanek, Jr. et al. | |
| 2013/0086861 A1 | 4/2013 | Masanek, Jr. et al. | |
| 2013/0093115 A1 | 4/2013 | Masanek, Jr. et al. | |
| 2013/0093116 A1 | 4/2013 | Masanek, Jr. et al. | |
| 2013/0095291 A1 | 4/2013 | Masanek, Jr. et al. | |
| 2013/0095295 A1 | 4/2013 | Masanek, Jr. et al. | |
| 2013/0111836 A1 | 5/2013 | Masanek, Jr. et al. | |
| 2013/0136899 A1 | 5/2013 | Milella, Jr. et al. | |
| 2013/0180195 A1 | 7/2013 | Moller, Jr. et al. | |

FOREIGN PATENT DOCUMENTS

| | | | |
|---|---|---|---|
| EP | 1514498 A1 | 3/2005 | |
| JP | S54-79715 U | 6/1979 | |
| JP | 59007027 A | 1/1984 | |
| JP | 218046 A | 1/1990 | |
| JP | H6-71715 U | 10/1994 | |
| JP | 9-32247 A | 2/1997 | |
| JP | 09165897 A | 6/1997 | |
| JP | 11-152882 A | 6/1999 | |
| JP | 2004-188100 A | 7/2004 | |
| JP | 2009108579 A | 5/2009 | |
| KR | 20060005296 A | 1/2006 | |
| WO | 2011053710 A1 | 5/2011 | |

OTHER PUBLICATIONS

Japanese Patent Office, Notification of Reasons of Refusal issued for Japanese Patent Application No. 2012-154195 on Jun. 24, 2014.

United States as ISA, International Search Report and Written Opinion of the ISA issued in connection with International Application No. PCT/US2010/054515 on Feb. 18, 2011.

United States as ISA, International Preliminary Report on Patentability issued in connection with International Patent Application No. PCT/US10/54515, May 1, 2012.

United States as ISA, International Search Report issued in connection with International Patent Application No. PCT/US2012/051609 on Nov. 2, 2012.

European Patent Office, Extended European Search Report issued on Jul. 31, 2014 in connection with European Patent Application No. 10827475.4.

* cited by examiner

METHOD OF MAKING A FLOOR TILE WITH OVERMOLDED PADS

RELATED APPLICATIONS

This application is a continuation in part of copending U.S. patent application Ser. No. 12/609,959 filed Oct. 30, 2009, and is a further continuation in part of copending International Patent Application No. PCT/US10/54515 filed Oct. 28, 2010, which in turn is a continuation in part of pending U.S. patent application Ser. No. 12/609,959 filed Oct. 30, 2009. The present application is further a division of pending U.S. patent application Ser. No. 13/217,556 filed Aug. 25, 2011. All of the foregoing applications are owned by a common assignee. The specifications and drawings of each of them are fully incorporated by reference herein.

BACKGROUND OF THE INVENTION

Conventional modular injection-molded tiles are known in the art for laying across upper surfaces of garage floors, sports surfaces, outdoor surfaces and other substrates. These tiles typically are twelve to thirteen inches square and can be manually assembled and disassembled. A common feature of these tiles is their ability to be snapped together, with few or no tools, using male and female connectors molded into each tile for the purpose.

Conventional single tiles are molded to be a single, uniform color such as all-black or all-red. The consumer typically can choose different tiles in different colors. The consumer or contractor will often choose two or more colors for a particular floor, for assembly into an aesthetically pleasing pattern. But manufacturing an injection-molded plastic tile that has two or more perceptible colors per tile is more difficult and to date no such tile has been provided that has proven to be acceptable to the consumer.

Many conventional modular plastic tiles are easily dislodged from their positions on the floor (particularly where wheeled vehicles are driven onto and off of them) and require a rubber sheet or the like as a substrate. It would therefore be advantageous to furnish a floor tile, for applications in which a large displacing lateral force may be applied to the tile, and which does not require a nonslip sheet as a substrate.

Previous attempts have been made to produce plastic modular tiles that have cushioning characteristics. U.S. Patent Application Publication No. US 2009/0031658 A1 discloses modular athletic floor tiles that have a plurality of premolded rubber inserts which, after molding, are physically inserted into receiving holes in a molded plastic substrate. In one embodiment each rubber insert has a face that is stands up from the surrounding top floor surface. The body of each rubber insert extends all the way through the plastic substrate or base and well below its bottom. The rubber inserts are selectively compressed when an athlete stands on them, giving a cushioning effect. But it is believed that the separate molding of these inserts, flash removal from them and physical insertion of them into respective receiving holes in the plastic tile substrate is time-consumptive and greatly increases the cost of manufacture of the resultant tile.

A need therefore persists in the industry for modular plastic tiles which can sustain heavy loads but have non-slip characteristics, which will be effectively joined together, which can be provided in a plurality of colors per tile, and which can be manufactured quickly and inexpensively.

SUMMARY OF THE INVENTION

According to one aspect of the invention, a modular floor tile is provided which may be used to create a flooring surface including a plurality of like tiles. A first polymer compound is used to mold a body of the tile. The body has at least one feature overmolded onto the upper surface of the body from a second polymer compound which is different from the first polymer compound. A second polymer compound gate is disposed to be adjacent a lower surface of the tile body and to be remote from the upper surface thereof. The gate communicates to the upper feature through a through-hole which extends from the lower surface to the upper surface. A vent hole, laterally spaced from the through-hole, extends from the upper surface back to the lower surface and is in communication with the upper feature. During the injection of the second polymer compound, molten polymer makes its way from the gate, through the through hole and into the cavity in which the upper feature will be created. The vent hole permits gas or other fluid to be displaced out of the upper feature cavity, thereby obviating or minimizing any void in the as-molded upper feature which might otherwise occur. In one embodiment a portion of the upper pad extends through the vent hole to be disposed below or protrude onto the lower surface. Preferably, the tile has many such pads on its upper surface, and many such support members downwardly depending from its lower surface. Groups of these pads and support member portions may be molded together in a continuous phase of the second polymer compound.

The second polymer compound may differ from the first polymer compound in rigidity, coefficient of friction, color, or some or all of these, and in one embodiment the upper feature constitutes a nonslip pad. In one embodiment a spaced-apart plurality of such upper features are formed as connected to one gate, through a plurality of through-holes, with at least one vent hole accorded to each of the upper features. In one embodiment the vent hole is laterally positioned to be maximally spaced from the through hole and still be within the periphery of the upper feature. In one embodiment the periphery of the upper feature is defined by a smoothly finished crush ring which prevents flash of the second polymer compound.

In another aspect of the invention, a modular floor tile of the above construction further has at least one lower feature overmolded onto the lower surface of the tile body from the second polymer compound. The gate communicates directly with this lower feature by a path which does not pass through the body. The lower feature may, for example, be a "skin" overmolded over a support member core, the skin and core constituting a support member. A portion of the second polymer compound may extend from the upper feature, through the vent hole and onto the lower surface of the body, and in such embodiment it is preferred that the lower feature as-molded be spaced from such portion. This may be accomplished by forming a crush pad completely laterally around such portion and also around the lower feature.

There may be a plurality of such lower features, all connected to a single gate. In one embodiment, groups of upper features and associated lower features all connect to respective common fill points, with the tile having a plurality of these groups.

In a further aspect of the invention, a method of forming a plastic modular floor tile includes molding a body of a first thermoplastic polymer compound, and then overmolding the body using a second polymer compound that has different characteristics from the first, such as differences in rigidity, coefficient of friction and/or color. The step of overmolding includes the substeps of positioning a gate adjacent the lower surface of the tile body and remote from an upper surface thereof; and flowing polymer from the gate through a through-hole to form an upper feature on the upper surface where the upper feature has a surface area larger than the through-hole.

In one embodiment, the method further includes flowing the molten second polymer compound from the gate, by a path which does not pass through the tile body, to a lower feature which is overmolded on the lower surface of the body. The method may also include the step of flowing molten second polymer compound through the vent hole such that a portion thereof protrudes onto the lower surface of the tile body. In this last instance the method further preferably includes spacing such portion from the lower feature as by a crush pad, so that the flow of polymer creating the lower feature won't conflict with the flow of polymer creating the upper feature, and so that any gas or fluid will be positively displaced from the upper surface through the vent hole. In one embodiment, groups of upper and lower features are each formed from polymer flowing from a single respective common fill point. The method may be used to overmold nonslip pads on the tile upper surface and, in one embodiment, to simultaneously overmold support member nonslip skins on the lower surface of the tile.

In one embodiment, the method further includes overmolding nonslip pads which have an area on the upper surface of the floor tile larger than an area on the upper surface of the through hole. In a further embodiment, the method includes forming, around each location at which a pad is to be molded, a smooth crush ring, to prevent flashing of the second polymer compound.

BRIEF DESCRIPTION OF THE DRAWINGS

These and further aspects of the invention and their advantages can be discerned in the following detailed description, in which like characters denote like parts and in which.

DETAILED DESCRIPTION

Figure 1:
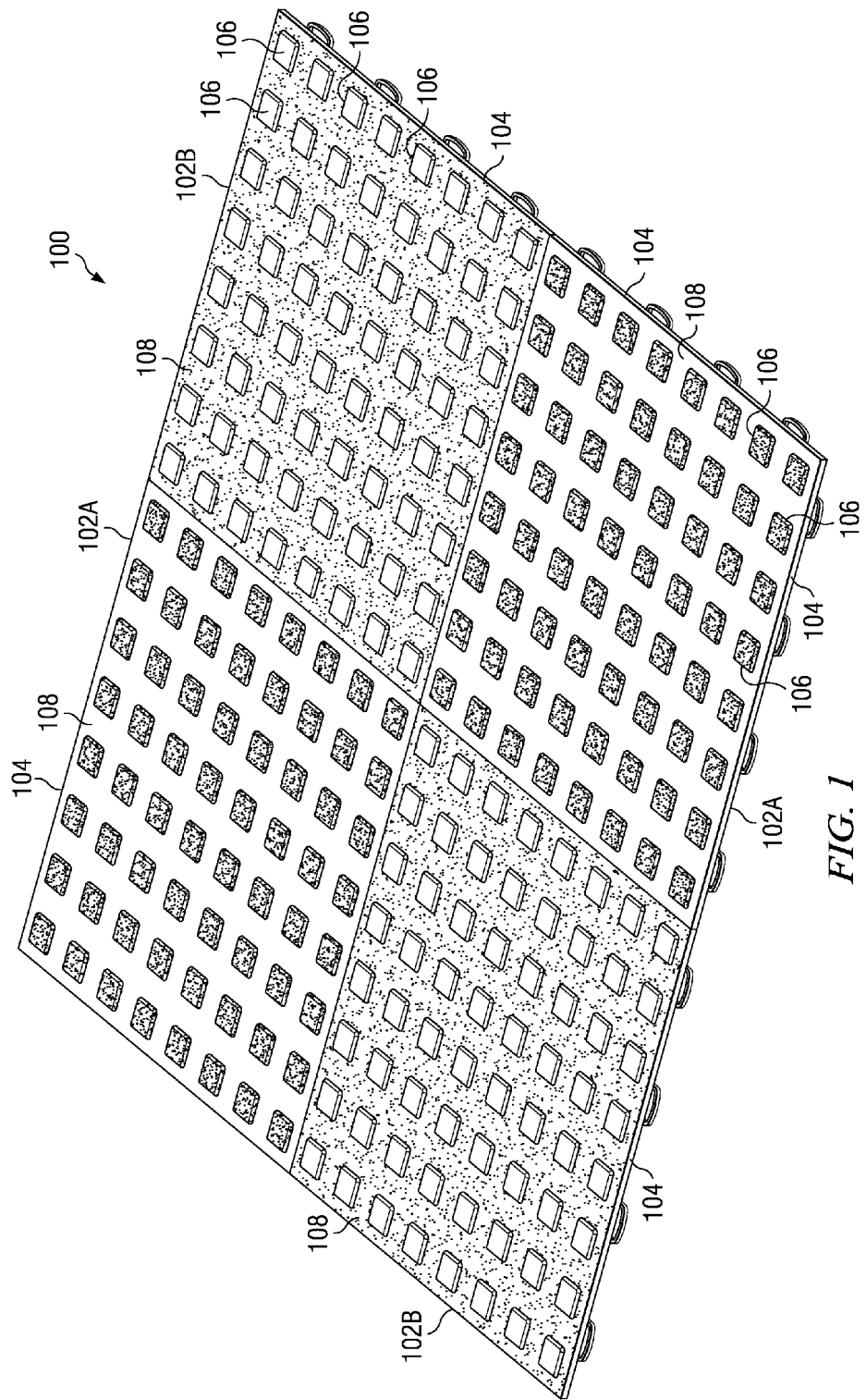
FIG. 1 is an isometric view of four modular floor tiles according to the invention, as assembled into a portion of a flooring surface.

Modular floor tiles according to the invention can be used to form a flooring surface, a representative portion 100 of which is shown in FIG. 1. In this illustrated embodiment, the flooring surface 100 is made up of tiles 102, including first floor tiles 102A and second floor tiles 102B, which are identical except as to color. The floor tiles 102A each have a body 104 injection-molded from a first polymer compound, preferably comprising a polymer which is relatively rigid when solidified and which can be selected from the group consisting of polyolefins including polypropylene and high molecular weight polyethylene, rigid thermoplastic polyurethane (TPU), acrylonitrile butadiene styrene (ABS) and rigid polyvinyl chloride (PVC). The first polymer compound may further include filler such as talc to aid in achieving surface flatness, and a pigment. Floor tiles 102B have bodies 104 which preferably are made of a polymer compound identical to that forming bodies 104 of tiles 102A, except possibly for the choice of pigment or colorant. Each floor tile 102 preferably has an array of features 106, or raised pads, on its upper surface 108. The pads 106, which preferably are spaced apart on the upper surface 108, are overmolded onto the upper surface 108 using a second polymer compound, which has different characteristics from the first.

The differences between the first and second polymer compounds can include color and/or hardness. In one embodiment the second polymer compound, once solidified, is softer or less rigid than the first (once solidified), and has a higher coefficient of friction with respect to most objects than does the first. In another embodiment the hardness of the first and second compounds (once solidified) is about the same, but the colors are distinctly different. In a third embodiment, the hardness (once solidified) of the second compound is greater than that of the first. In a preferred embodiment, the second polymer compound can be selected from the group consisting of styrene ethylene butylene styrene based thermoplastic elastomer (SEBS TPE), other TPEs, soft TPU, or soft PVC. Polypropylene as the principal polymer in the first compound, and SEBS TPE as the principal polymer in the second polymer, are particularly preferred and have demonstrated good adherence to each other.

One aesthetic advantage of the invention is that the first and second polymers can be provided in contrasting colors, and that because of the molding techniques used in the invention, pads 106 can be colored differently than upper surface 108 yet present a sharp, commercially acceptable appearance.

Figure 2:
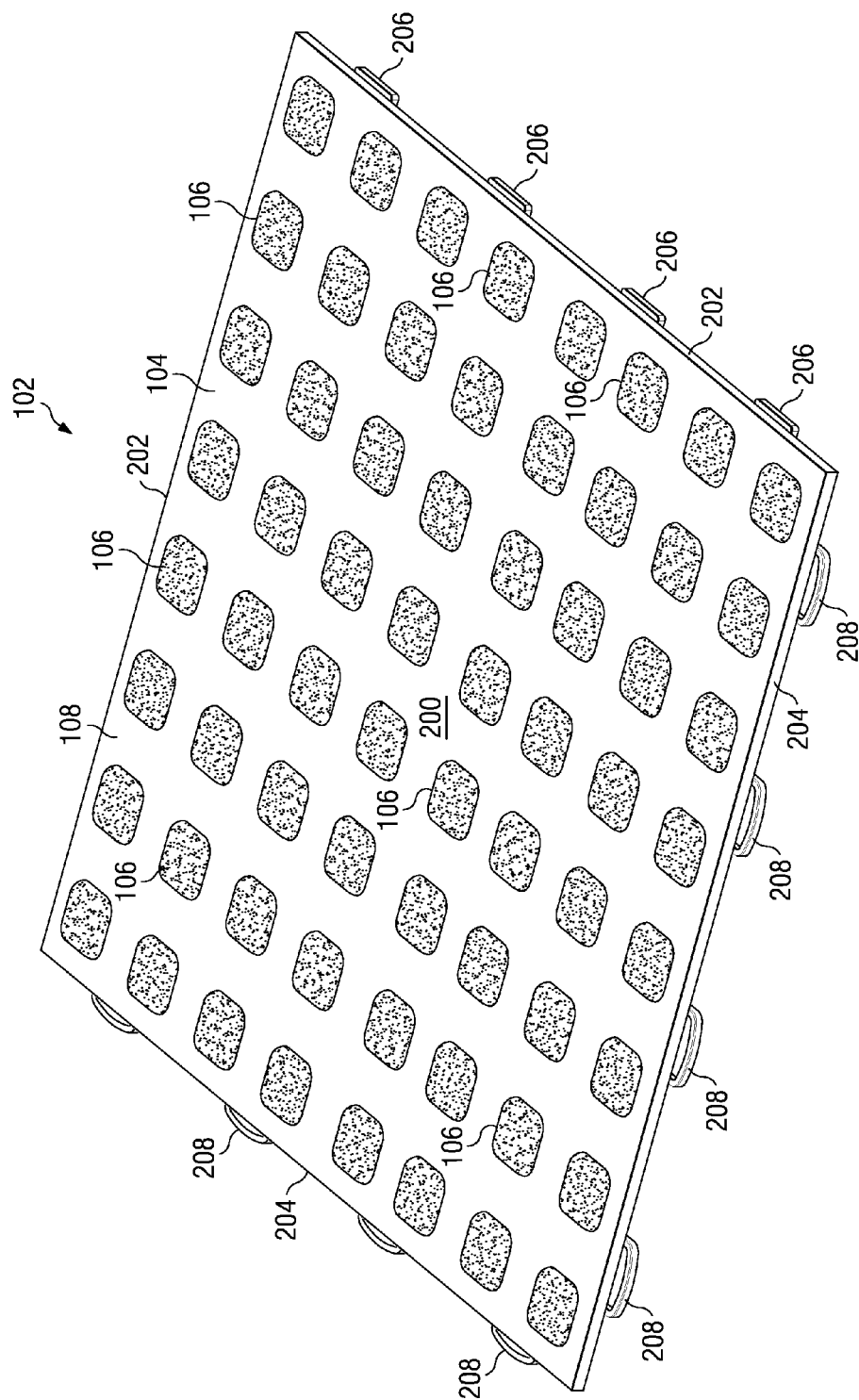
FIG. 2 is a front isometric view of one of the modular floor tiles shown in FIG. 1.

A top isometric view of one tile 102 is shown in FIG. 2. The body 104 of tile 102 is in main part a substantially horizontal and planar web 200 that has a plurality of lateral edges 202, 204. Each of the web edges 202, 204 downwardly depends from the upper surface 108 to a lower surface (not shown in FIG. 2). In the embodiment illustrated in FIG. 2, edges 202, 204 are orthogonal to surface 108, are planar and are at right angles to each other. But the tile 102, and the edges 202, 204 of it, can take other shapes. For example, the tile 102 can be hexagonal or triangular, and the edges 202, 204 could be wavy or curved instead of straight. Instead of edges 202, 204 being planar, as shown, they could be stepped or have tongues and corresponding grooves (see FIGS. 15-16 for an embodiment in which the lateral edges are stepped). It is preferred, however, that the shape and profile of each web edge 202 be complementary to the shape and profile of each web edge 204, such that when adjacent tiles are joined together, edges 202 and 204 will fit together closely.

The illustrated embodiment has a two-dimensional array of sixty-four raised pads 106 as located on a square surface of about twelve inches in length and width. Alternatively there could be as few as one pad 106, which preferably would be larger and possibly elongated and branched and/or sinuous. It is preferred to have a regular pattern of the pads 106 so that sub-units of the tile 102 can be trimmed off of it, in a manner to be explained below, and so that as trimmed the tile 102 will retain an aesthetically pleasing appearance. The illustrated pads 106 are rounded squares but could take other shapes such as circles, ovals, hexagons, triangles, distinctive logos or other shapes.

The first edges 202 each are equipped with at least one, and preferably several, latches 206. The second edges 204 each have at least one, and preferably several, loops 208. It is preferred that the number of latches 206, distributed in spaced relation along first edge 202, equal the number and position of loops 208, which are distributed in like spaced relation along each second edge 204. In the illustrated embodiment the latches 206 are pressed downward and snapped into loops 208, in a manner which will be described in further detail below.

Figure 3:
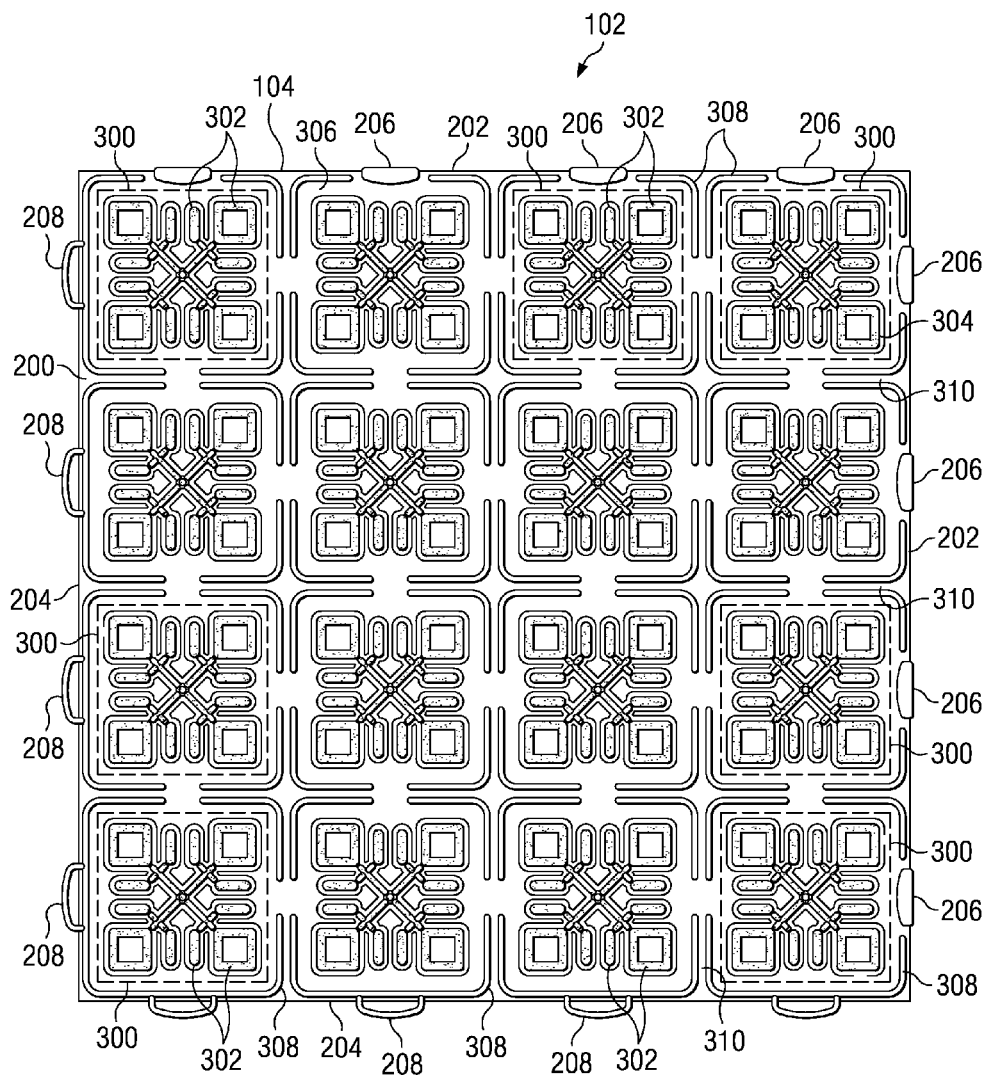
FIG. 3 is a back view of the modular floor tile shown in FIG. 2.

In the bottom view of tile 102 shown in FIG. 3, there can be seen sixteen groups 300 of support members 302. According to one aspect of the invention, each support member 302 is formed in part by a skin 304 of a relatively soft polymer compound such as once comprising TPE, and has a core that is molded as part of the body 104 from a polypropylene-based compound or other relatively rigid polymer composition. Some of the support members 302 are annular and take the shape of squares with empty centers. Other support members 302 in each group 300 are short linear segments. The support members will be discussed in further detail below. Preferably the general lower surface 306 also has, depending downwardly from it, a plurality of elongate rigid support ribs 308 that have no TPE or other soft polymer skin. The support ribs are integrally molded with the web 200 of body 104.

In the illustrated embodiment, the rigid support ribs 308 form partial outlines of rounded squares, each one of which contains one of the groups 300 of the support members 302. The rigid support ribs 308 are so positioned that one or more of them are not very far away from any group 300 of support members 302. This permits the rigid support ribs 308 to accept most of the load of heavy objects (such as vehicles) imposed on the upper surface 108 of tile 102.

The elongate ribs 308 also define and delimit linear channels 310, one set of which are aligned along a length of the tile 102, and another set of which are at right angles to these and are aligned along a width of the tile 102. The channels 310 are disposed between, rather than through, the support member groups 300 and (on the upper surface) the pads 106. This provides the consumer a trim guide for cutting apart tile 102 in a lengthwise or widthwise direction, or both, in predetermined increments such as three inches or twenty-five percent of tile 102's length or width. As projected onto the single horizontal plane occupied by web 200, the center line of each channel 310 will substantially exactly bisect the distance between the centers of adjacent pads 106 on either side of the center line. The distance from the center line of the channel 310 to a center of a pad 106 is one-half of the distance from one center of a pad 106 to a next adjacent pad 106. Since pads 106, support member groups 300, latches 206 and loops 208 repeat in a regular pattern, such as on three-inch centers, and since the pads 106 are exactly twice as far apart from each other as the closest of them are to the edge 202 and/or 204 (see FIG. 2) or a channel 310, the consumer may use trimmed tiles on the periphery of the flooring surface to extend the flooring surface by another three, six or nine inches, or alternatively 25%, 50%, or 75% of the length or width of tile 102. The regular pattern and spacing of raised pads 106 will continue over from untrimmed tiles onto such trimmed peripheral tiles without visually noticeable interruption and therefore the result will be aesthetically pleasing.

Figure 4:
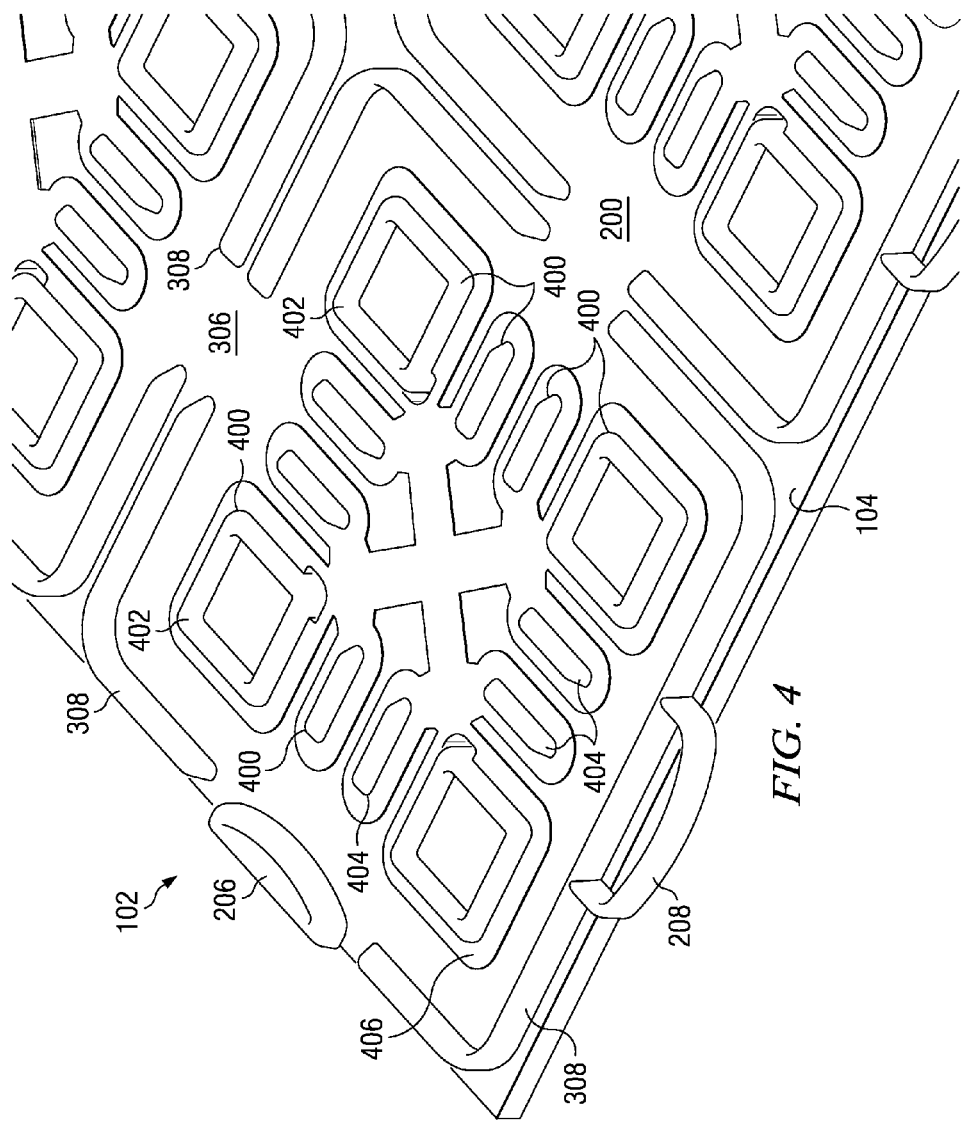
FIG. 4 is an isometric detail of the back of the floor tile shown in FIG. 3, illustrating a tile body prior to overmolding with a second polymer compound.
Figure 5:
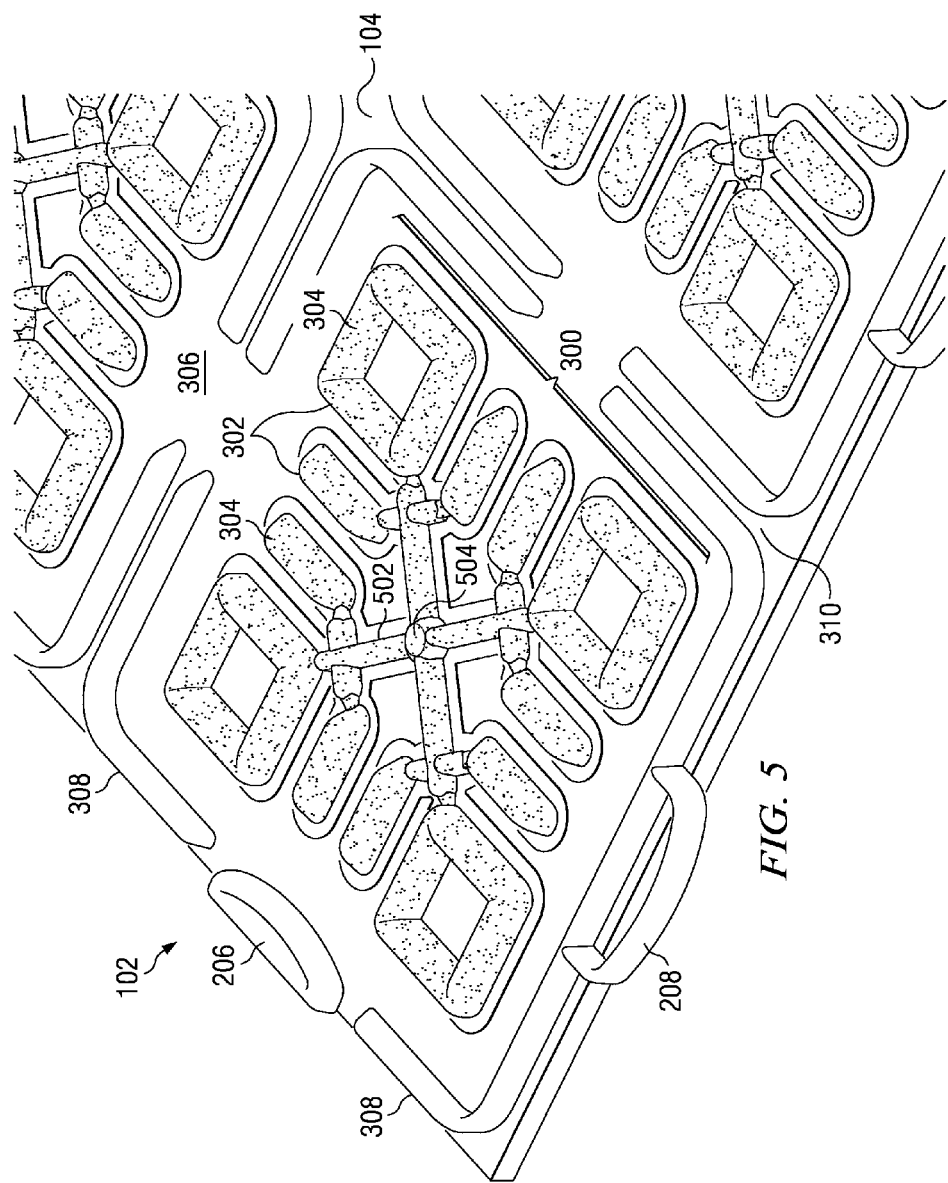
FIG. 5 is an isometric detail of the same tile region shown in FIG. 4, shown after overmolding has been completed.

FIGS. 4 and 5 are details of the tile lower surface, showing a single group 300 of support members 302 before and after a second polymer compound is overmolded onto the body 104 of the tile 102. In FIG. 4 there can be seen a plurality of support member cores 400 which depend downwardly (in this view, extending toward the top of the paper) from a general lower surface 306 of the substantially horizontal web 200 that makes up most of the tile body 104. The cores 400 do not downwardly depend as far as the support ribs 308. Ribs 308 are not overmolded. In the illustrated embodiment there are provided, in each group 300 of support members 302, four annular cores 402 and eight cores 404 formed as short linear segments and in parallel pairs nearby the annular cores 402. Also seen here is, for this group 300, a crush pad 406 which in use is slightly lower than the general surface 306 (in this bottom view, pad 406 is slightly raised relative to general surface 306). The crush pad 406 is formed to be closely adjacent all of the support member cores 400 and laterally surrounds all of the cores 400 and the runners 502 connecting the support members. The crush pad 406 is finished to have a smooth surface (general lower surface 306 can instead be textured) and is used as a shutoff surface to prevent the flashing of the second polymer compound during a "second shot" or overmolding step of fabrication.

FIG. 5 shows the same area after overmolding. A skin 304 of the second polymer now appears on the bottom surfaces and sides of each of the cores 400, and in this embodiment completes the support members 302. While in one embodiment the skins 304 could be overmolded separately on each core 400, in the illustrated embodiment the skins 304 within the support member group 300 are part of a continuous phase. To save cost, the area covered by skins 304 is limited and, as seen in FIGS. 3 and 5, does not include a majority of the tile body lower surface 306. The skins 304 preferably do not extend to cover the centers of the annular cores 402 or other regions outside of crush pads 406. Lateral runners 502 connect a common fill point 504 to each of the skins 304. It has been found that as the second of a double-shot injection, skins 304 molded of a SEBS TPE compound have excellent adherence to the preferably polypropylene compound cores 400 (FIG. 4). As completed, the composite support members 302 are of approximately the same depth (in a direction orthogonal to the web 200) as the support ribs 308. The support members 302 provide further structural support to the web 200 but at the same time act as a friction surface to grip the surface upon which the tiles are laid.

Figure 6:
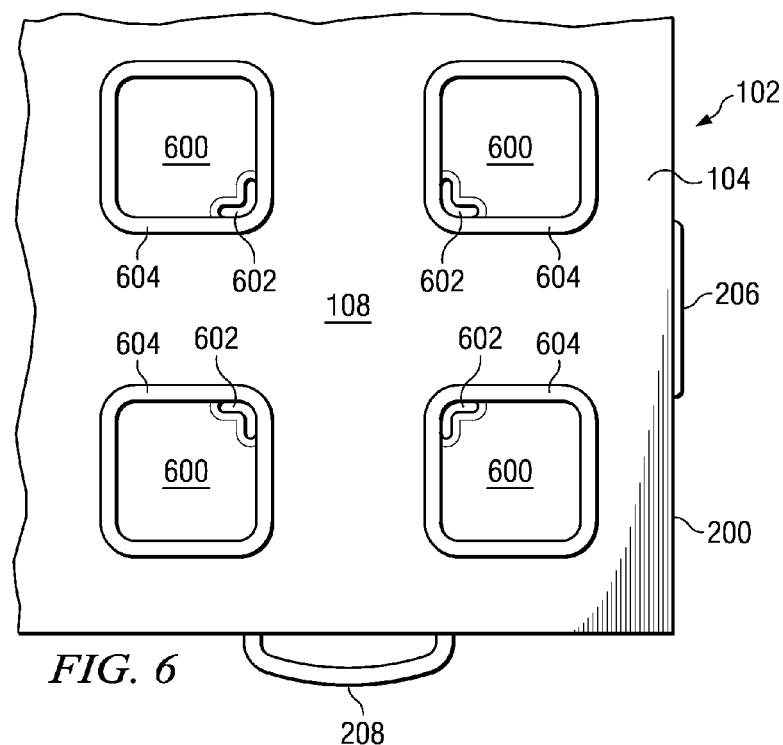
FIG. 6 is a detail of the upper surface of a tile according to the invention prior to overmolding, showing flow-through points and crush rings.
Figure 7:
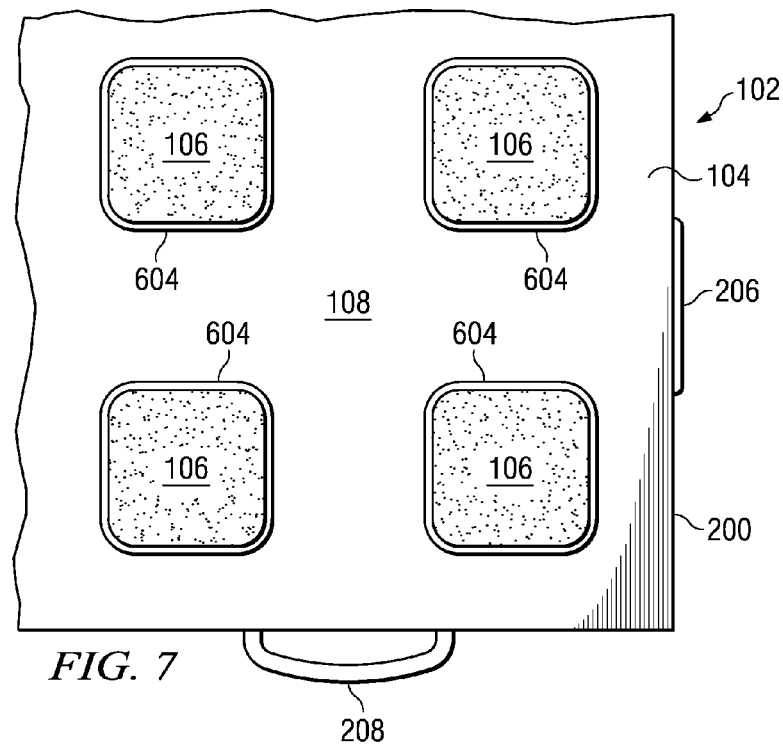
FIG. 7 is a detail of the same region illustrated in FIG. 6, shown after top surface pads have been overmolded.

FIGS. 6 and 7 are details of a similarly sized area on the top of tile 102, before and after overmolding, illustrating one group of pads 106, which are interconnected in a continuous phase of solidified second polymer compound. In the illustrated embodiment, each of the overmolded pads 106 resides in a shallow recess or receptacle 600 whose surface is lower than that of the general upper surface 108. For each recess 600 there is provided at least one through-hole 602 which communicates the top surface of the tile web 200 to a lower surface thereof. In the illustrated embodiment the through-holes are a small fraction (about 5%) of the bottom of the recesses 600, as the viscosity (at molding temperature) of the preferred second polymer compound is low enough, and the second-shot temperature and injection pressure are high enough, that no larger through-holes are necessary to flow molten polymer from the lower side of the tile body 104 to the upper side thereof, nor is more than one through-hole per recess 600 necessary in the preferred embodiment. Limiting the size of through-holes 602 enhances the structural integrity of the tile 102. However, in alternative embodiments, the size and/or number of the through-holes 602 may be increased to accommodate more highly viscous second-shot polymer compounds.

The recesses 600 are each laterally surrounded by a crush ring 604. Each crush ring 604 is finished to be smooth (in contrast, the general upper surface 108 of the body 104 is preferred to be textured) and is slightly raised relative to the general upper surface 108. The crush rings 604 provide a tight overmold shutoff that prevents the flashing of the second polymer compound outside the confines of the crush rings 604.

FIG. 7 is a detail of the tile upper surface after the overmolding step. The second polymer compound is injected into the mold at one or more points adjacent the lower surface of body 104, flows through each of the through-holes 602, and occupies cavities in the second-shot mold to create the raised pads 106. A top surface of the pads 106 is raised above that of general surface 108, creating a nonslip surface characteristic. Through this methodology overmolding artifacts on the upper surface of the tile 102 are avoided, producing a more pleasing appearance.

Figure 8:
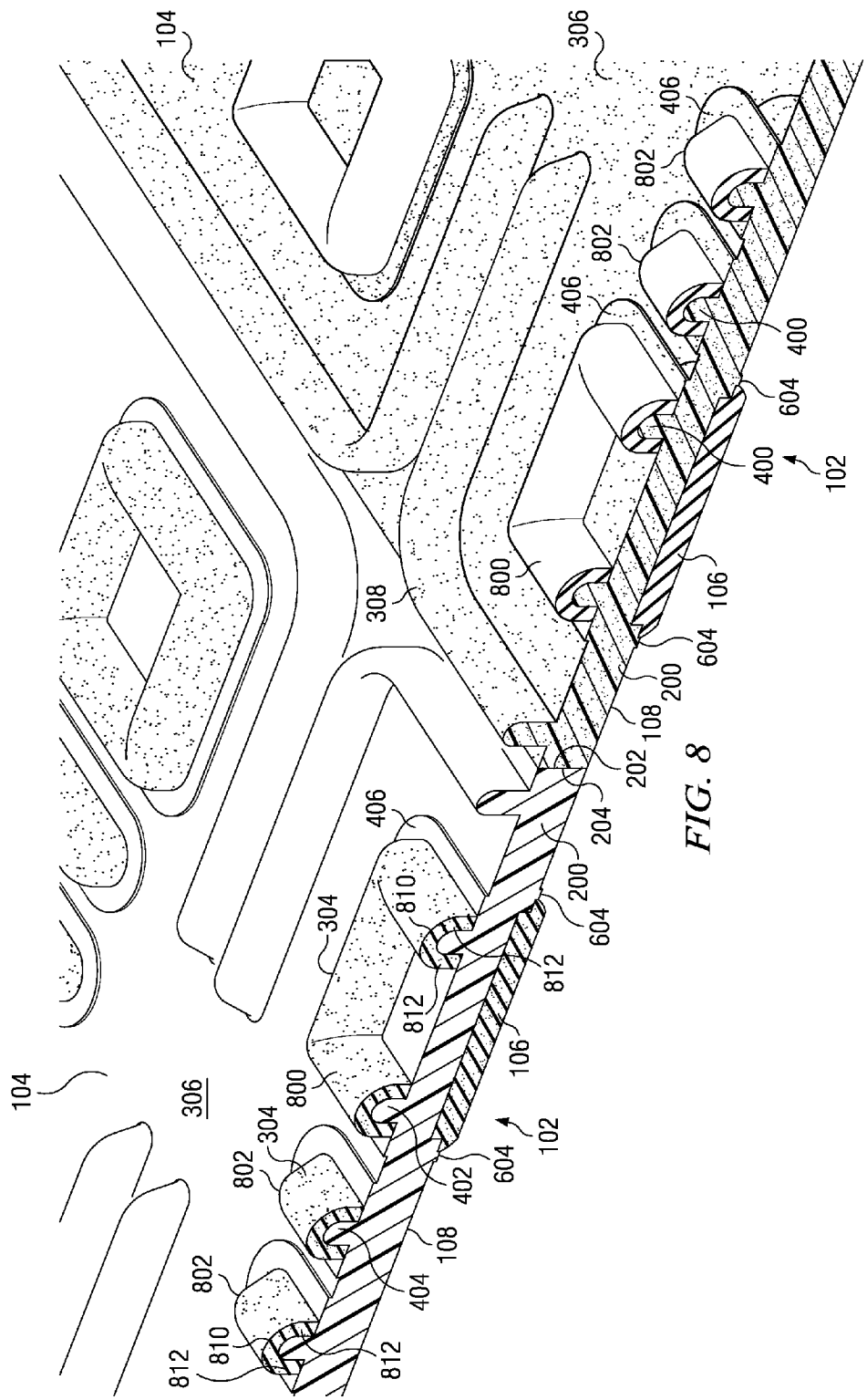
FIG. 8 is a magnified sectional detail of two adjoining tiles showing internal structure of the support members.

FIG. 8 is a sectional view of two tiles 102 joined together, taken through annular support members 800, linear support members 802 and rigid ribs 308. Each skin 304 completing a support member 800, 802 has a portion 810 which is formed on the lower end or bottom surface of each core 400, 402. Preferably, each skin 304 also includes portions 812 which cover all or portions of adjoining side walls of the cores 400, 402.

The rounded square or annular support members 800 are each in approximate registration or alignment with the edges or lateral periphery of a respective raised pad 106 on the upper surface 108 of the tile 102. The support members 800 will receive any weight placed particularly on the raised pads 106 and will prevent any shear stress from developing in nearby regions of the horizontal web 200. The support members 800 and 802 each help support weight placed on the upper surface 108 of tile 102, while at the same time providing a friction or nonslip surface that will engage the substrate on which the tile is placed. The rigid members 308 provide rigid support of the entire tile 102 and delimit any compression of the TPE skin 500, the lower surface of which is preferably in the same plane as the lowest portion of ribs 308. FIG. 8 also shows the preferred profile of lateral edges 202, 204, which is planar and orthogonal to the plane of web 200. The components of the adjacent tiles 102 in FIGS. 8 and 9 have been stippled differently to illustrate that they can be of different colors.

Figure 9:
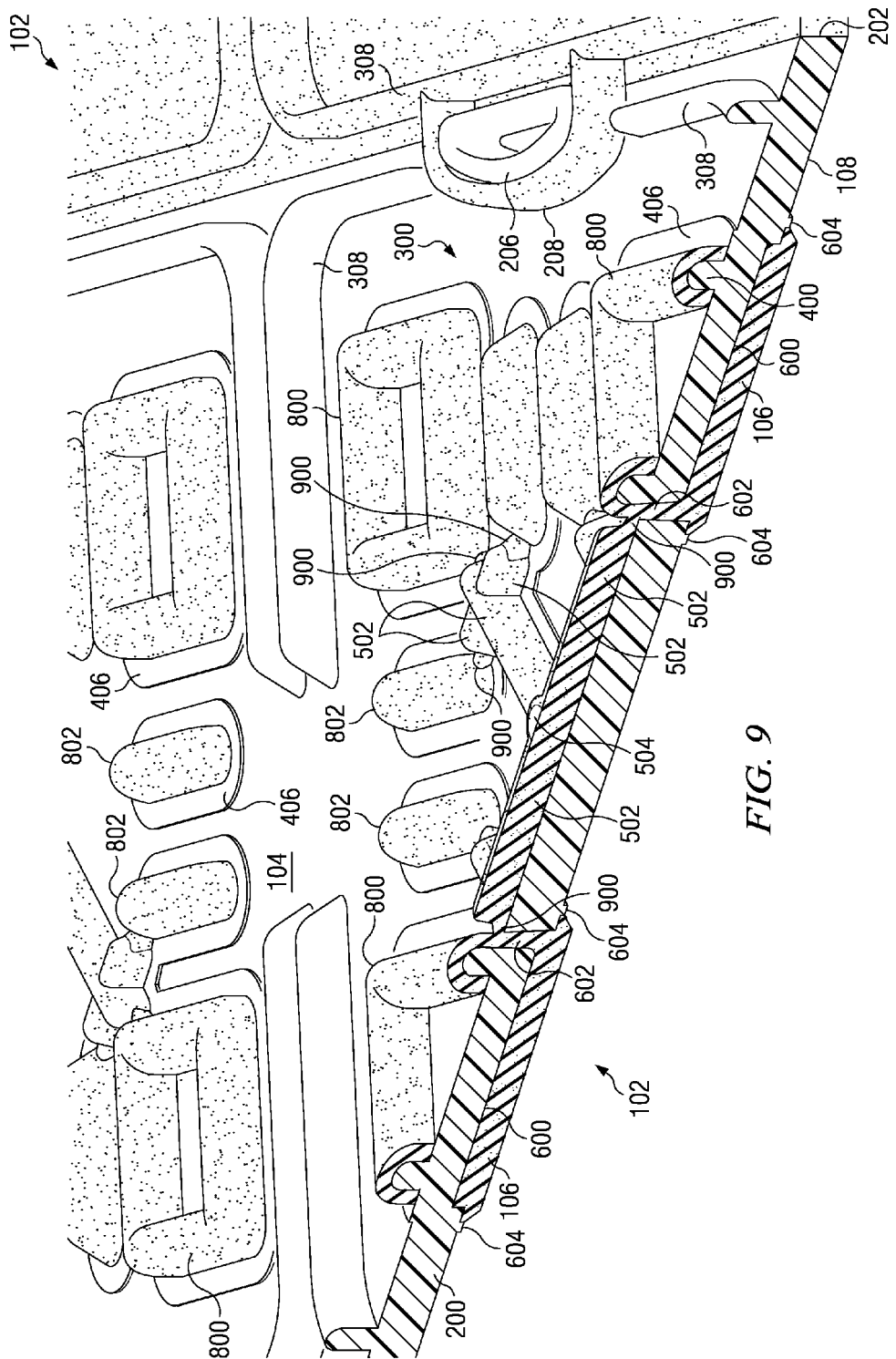
FIG. 9 is a magnified sectional detail of a tile showing the relationship of the overmolded features on the tile's lower and upper surfaces.

FIG. 9 is a magnified diagonal cross section (lower side up) of part of a tile 102, taken through two raised pads 106, support members 800 underneath and in approximate registry with respective ones of the raised pads 106, a common fill point 504 and two runners 502. In this illustrated embodiment, a common fill point 504 is provided for the skins of an entire group 300 of twelve support members 800, 802, and four associated raised pads 106 on the upper surface 108 of the tile 102. This illustrated embodiment has sixteen common fill points 504 on tile 102, one for each interconnected group 300 of support members 302 and associated pads 106. In an alternative embodiment the polymer compounds used for different ones of the fill points could be in different colors, producing groups of pads 106 on the upper surface 108 which are colored differently than other groups of pads 106.

The common fill point 504 is connected by a set of runners 502 which extend laterally from the common fill point 504, and on the lower surface of the web 200, to each of the support members 800, 802 in the group 300 where the common fill point 504 is located. In the illustrated embodiment, there are four main runners 502 that are separated by ninety degrees from each other. At its end remote from the common fill point 504, each runner 502 branches into three branches 900 that respectively connect to an annular support member 800 and two flanking linear support members 802. As can be seen in the sectioned runners 502, one of the branches 900 of each runner 502 is continuous with a through-hole 602, providing a conduit for the second polymer compound to the upper side 108 of the tile 102.

FIG. 9 also shows a latch 206 which has been inserted into a respective loop 208. The loop 208 is preferably molded as an extension of a rigid rib 308 in an adjacent tile 102. The latch 206 is integrally formed with web 200 and is formed in a gap between two ribs 308 that are adjacent an edge 202. The gap forming the discontinuity in linearly aligned rib segments 308 is large enough to have the latch 206 and the loop 208 disposed therebetween.

Figure 10:
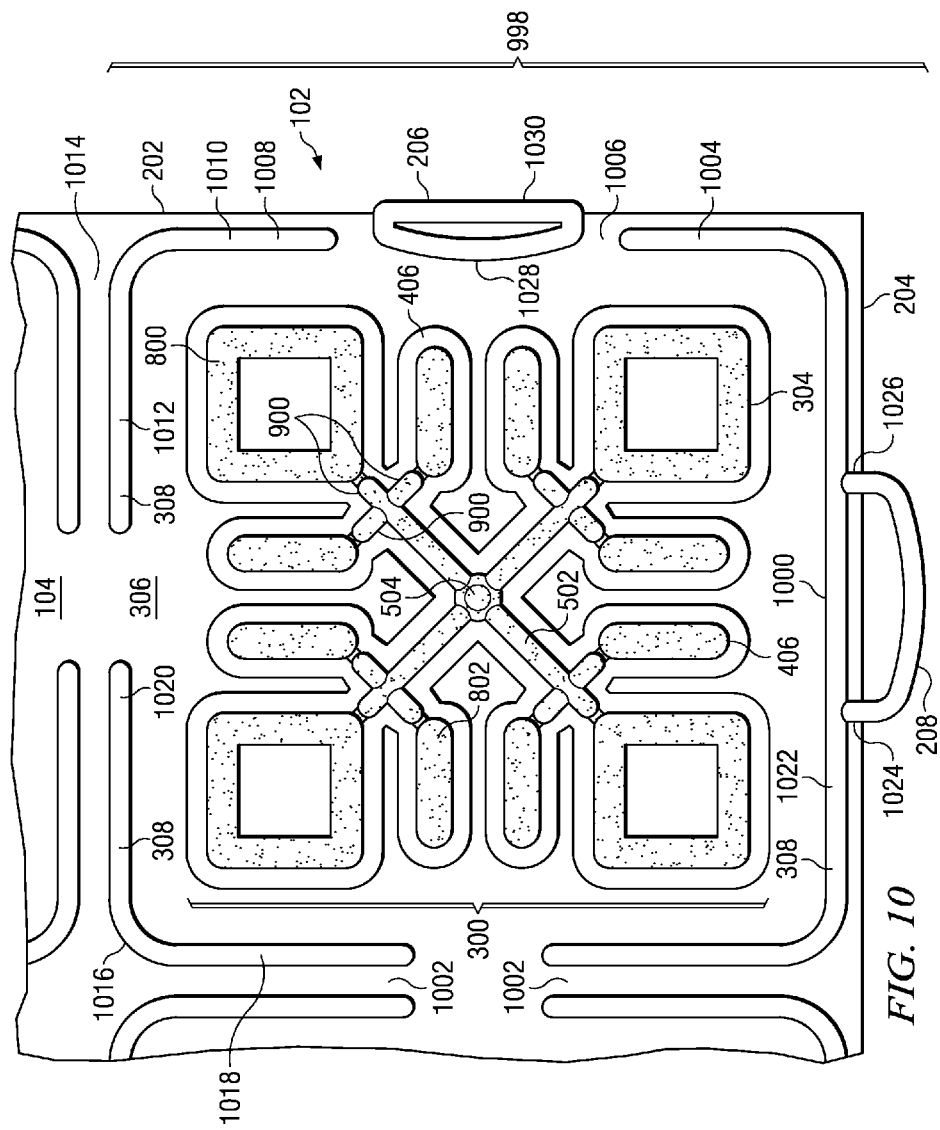
FIG. 10 is magnified bottom view detail of a tile according to the invention.

FIG. 10 is a bottom plan view of a one-sixteenth portion 998 of a tile 102, the illustrated portion 998 occupying an outer corner of tile 102. This corner 998 has three ribs 308 that surround the group 300 of support members 302. A rib segment 1000 is aligned with and positioned slightly laterally inwardly from an edge 204 of the tile 102. Rib segment 1000 continuously curves on its left side (as seen in this FIGURE) to form a boundary for a channel 1002. Rib segment 1000 has a section 1004 which continuously curves from the right side of rib section 1022 to become parallel and laterally inwardly offset from lateral edge 202, terminating at a gap 1006. A rib segment 1008 defines an upper right hand boundary of the portion or cell 998 and includes a portion 1010 that is in parallel with the lateral edge 202, a portion 1012 which helps define a boundary for a trim channel 1014, and a curved portion in between these. A third rib segment 1016, defining an interior corner of the cell 998, includes a portion 1018 that helps define channel 1002, a portion 1020 that helps define channel 1014, and a curved transition between them.

A portion 1022 of the rib segment 1000 that is near and parallel to lateral edge 204 has a loop 208 integrally formed with it. The loop 208 is connected to the rest of tile 102 only by a pair of widely spaced-apart and limited connection points 1024 and 1026. A cross-section of loop 208 and its length between connection points 1024 and 1026 are so preselected that loop 208 will be relatively flexible in comparison to the latch 206. The latch 206 may be a solid plug (not shown) or, as appears in the illustrated embodiment, may include a downwardly depending, inwardly facing convex wall 1028, connected at both of its ends to a downwardly depending, laterally outwardly facing wall 1030. The entire wall 1028, and a substantial portion of the wall 1030, are attached to the general lower surface 306 of the tile 102. Neither arcuate wall 1028 nor wall 1030 is as long as loop 208. These differences in size and degree of attachment to the rest of the tile 102 make the latch 206 substantially rigid relative to loop 208. In any interference between them, therefore, the loop 208 will flex or expand and the latch 206 will not substantially deform.

Figure 11:
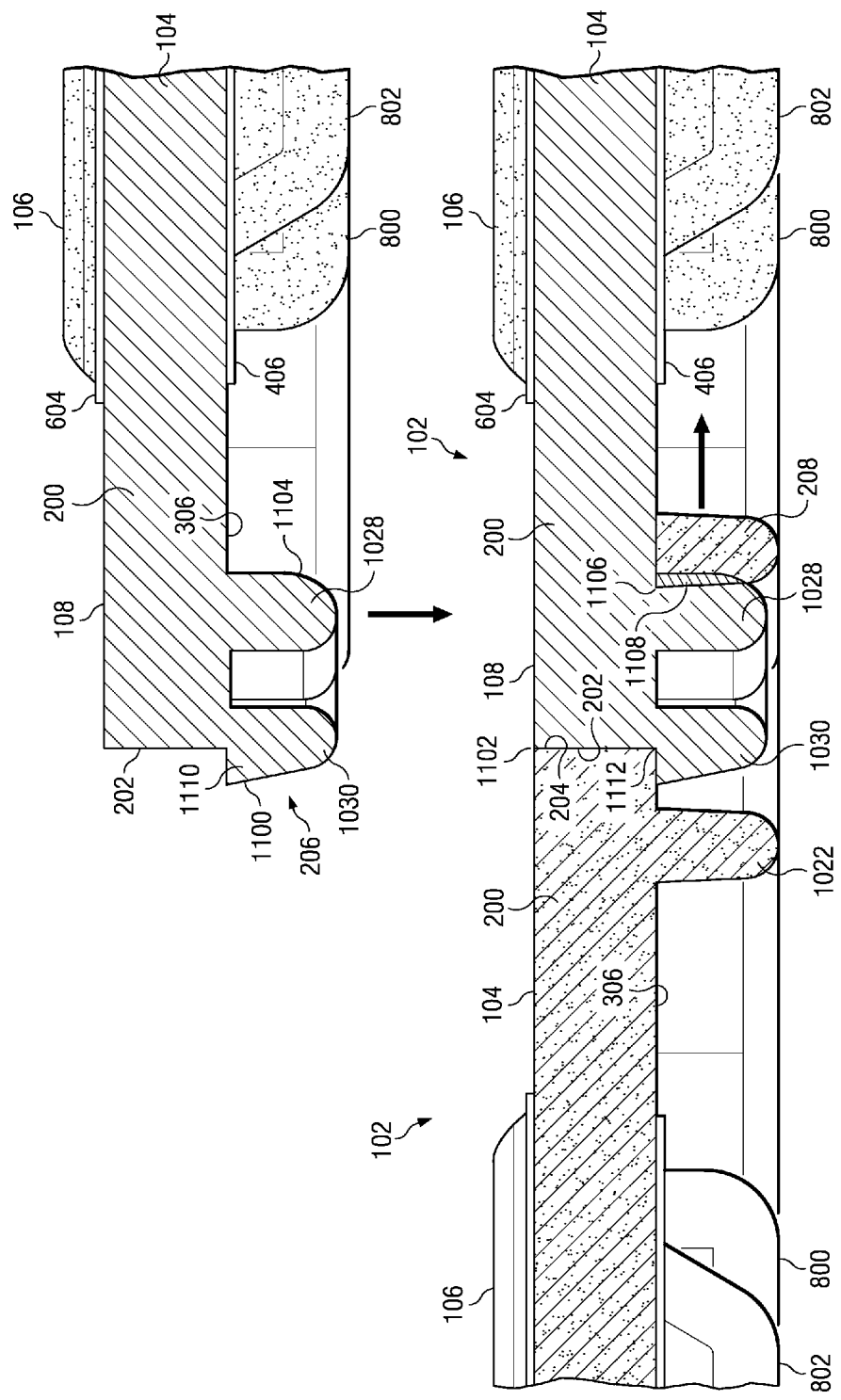
FIG. 11 is a magnified sectional view of two tiles being assembled together.
Figure 12:
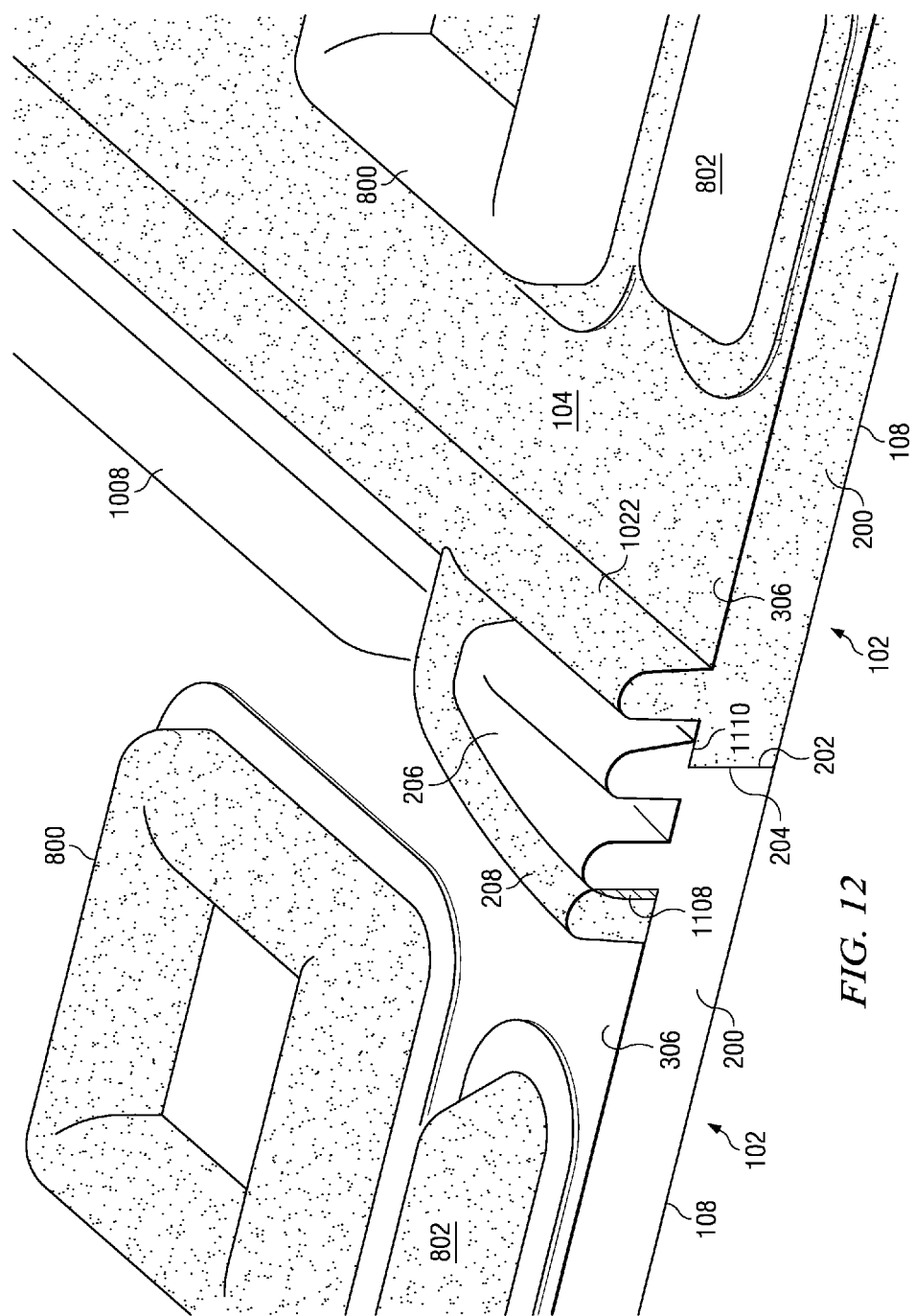
FIG. 12 is a magnified sectional view of two joined tiles taken through cooperating loop and latch structure.

FIG. 11 is a highly magnified sectional view showing how a male latch 206 is snapped into a receiving female loop 208 of an adjacent tile 102. The outer wall 1030 of the latch 206 has a surface 1100 which is beveled or sloped so that it will cam against an upper corner 1102 of the lateral edge 204. The inner wall 1028 of the latch 206 has a sloped or beveled surface 1104 which will cam against an upper interior corner or ridge 1106 of the loop 208. As the latch 206 is pressed downward into the loop 208, an interference will develop between the inner facing wall 1028 of the latch 206 and the loop 208, as shown by the hatched region 1108. Since wall 1028 of latch 206 is substantially more rigid than loop 208, the loop 208 will elastically expand along its length and will flex laterally outwardly from the tile 102 to which it is attached (in FIG. 11, rightward). Once the latch 206 is driven down far enough, a horizontal ledge 1110 of the outer latch wall 1030 will snap past a lower corner 1112 of the lateral edge 204 and will slide to the left along the general lower surface 306 of the adjacent tile 102. Even after this happens the loop 208 will remain under tension. This biases lateral edge 204 against mating lateral edge 202, producing a tight fit of these two surfaces and the tiles of which they are a part. As shown, the depth (in a direction orthogonal to the plane of web 200) of walls 1028, 1030 is slightly less than the depth of the walls of rib segment 1022 and loop 208, permitting a degree of overdrive when snapping the latch 206 into the loop 208. FIG. 12 is an isometric sectional view of two adjacent tiles taken through a loop 208 and an inserted latch 206, again illustrating the interference fit between the two.

Figure 13:
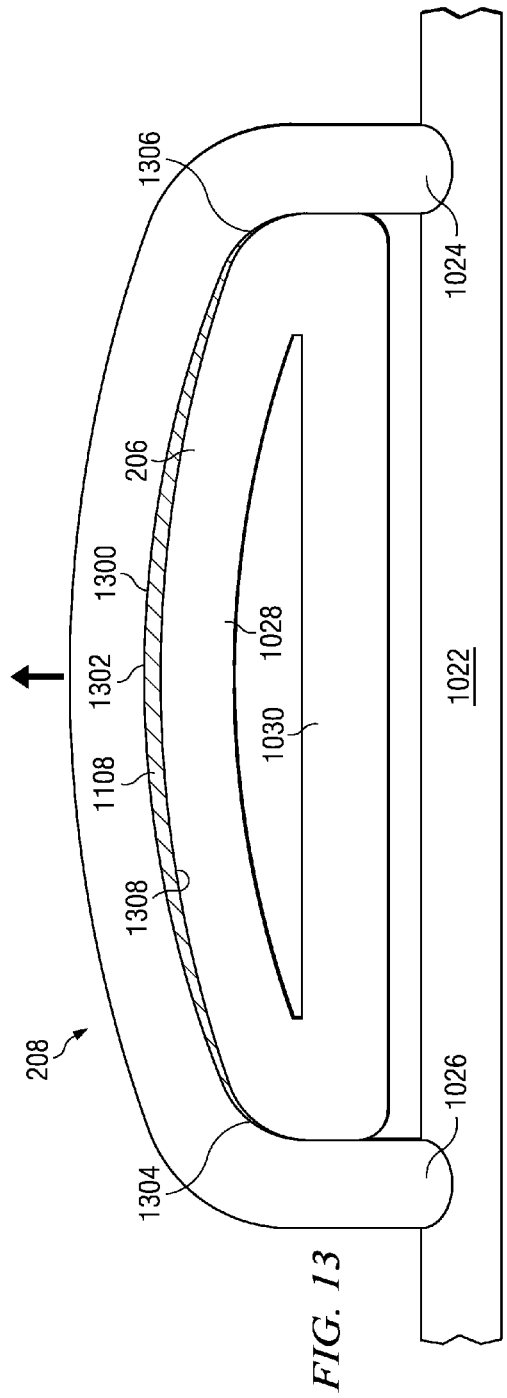
FIG. 13 is a diagram showing nonlinear interference between a latch and a loop according to the invention.

FIG. 13 is a schematic detail, from a bottom view, showing a latch 206 as it is received into a loop 208. The loop 208 is illustrated here in its unstretched and unflexed condition. As so superimposed a region 1108 of interference will exist between loop 208 and an inner wall 1028 of the latch 206, and this region 1108 will be of variable depth as measured in a lateral inward/outward direction. The inner wall 1028 has an inwardly-facing surface 1300 which has on it a point 1302 which is innermost and is farthest away from the lateral edge 202 of body 104 (see FIGS. 11 and 12) with which it is most closely associated. Preferably the inwardly-facing surface 1300 is arcuate and convexly so relative to the center of the tile 102. Surface 1300 can be more sharply curved than is shown. As one travels away from the innermost point 1302 along the surface 1300 (to the left or right in this FIGURE), the depth of interference region 1108 decreases, until the interference region 1108 vanishes altogether as one approaches either end 1304, 1306 of the surface 1300. Preferably the inner surface 1308 of the loop 208 is arcuately concave. More preferably the degree of concavity of the inner surface 1308 is less than the degree of convexity of the inward facing surface 1300 of the latch 206, that is, the surface 1308 is more gradually curved than surface 1300. In this way, the interference is minimized at the attachment points 1024, 1026, preventing the loop 208 from becoming over-stressed at its attachment points 1024, 1026 and reducing the likelihood of loop failure. It is relatively easy for loop 208 to stretch and flex at its middle, opposite innermost latch wall point 1302, as the length to either point 1026 or point 1024 is long. But the resistance to such stretching and flexing will increase as one approaches point 1024 or point 1026, as the points of attachment are closer. Varying the degree of interference in the manner shown therefore reduces the stress at the attachment points 1024, 1026. The attachment points 1024, 1026 may be reinforced with gussets 2502 (see FIG. 25) to prevent loop breakage.

Figure 14:
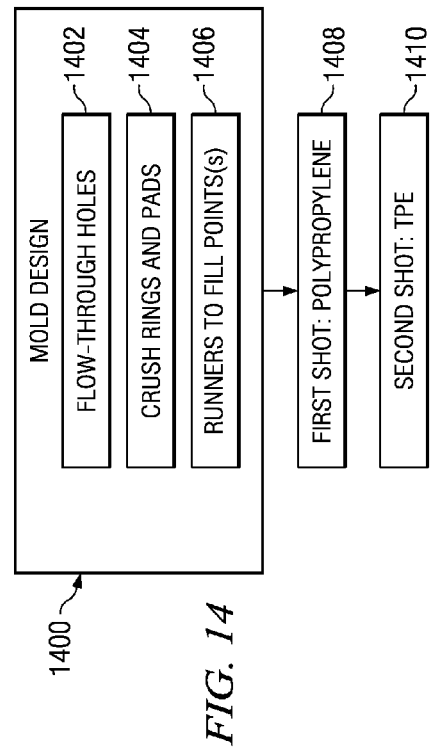
FIG. 14 is a schematic flow diagram illustrating steps in a manufacturing process according to the invention.

FIG. 14 is a schematic block diagram illustrating steps in a floor tile manufacturing process according to the invention. Step 1400 is a mold design step including many substeps, of which three are pertinent here. The mold (and the part produced thereby) should have certain characteristics, and these include the provision of flow-through holes at substep 1402. The flow-through holes are positioned to communicate the recesses 600 for the pads 106 (see FIG. 6), on the upper surface 108, to the common fill points 504 adjacent the lower surface 306. The second shot of polymer compound will use these flow-through holes (602 in FIG. 9) to access the cavities 600 in which the pads 106 are to be created. The size and number of through-holes 602 will be dictated in part by the viscosity of the second polymer compound at molding temperature, and the injection molding pressure to be used.

The designer also, at substep 1404, provides for crush rings 604 (FIG. 6) on the top surface 108 of the tile 102, and crush pads 406 (FIG. 8) on the bottom surface 306 of the tile 102. These surfaces preferably are flat, smooth, and slightly raised or outward in relation to the rest of the surfaces of which they are a part. The crush rings 604 and crush pads 406 closely laterally surround the regions into which the second polymer compound is to flow, creating a clean shutoff of the second polymer compound and preventing flashing. This is particularly important on the upper surface 108 as it will affect the aesthetic acceptability of the tile 102.

At substep 1406, the designer provides runners 502 (see FIG. 9) to communicate the common fill points 504 with the support members 800, 802 and the through-holes 602. The result of step 1400 will be tooling that can be used in a two-shot injection molding process according to the invention.

The mold is placed in an injection molding press and a first shot of polymer compound is injected into the mold at step 1408. As explained above, this first polymer compound is thermoplastic and preferably is relatively rigid, and can comprise polypropylene. Then, at step 1410, the mold is prepared for a second injection shot, in which further molding structure is used to define surfaces of pads 106, skins 304 and runners 502. A second shot of polymer compound is then injected into the mold, using a second polymer compound which has different characteristics than the first polymer compound, such as being harder or softer or being of a different color. Preferably the second polymer is elastomeric and for example can be constituted by SEBS TPE or another TPE. A preferred result of molding steps 1408 and 1410 is a composite floor tile which includes a body capable of withstanding a large amount of weight (such as might be imposed by a vehicle wheel) but still has nonslip characteristics on both its upper and lower surfaces.

Figure 15:
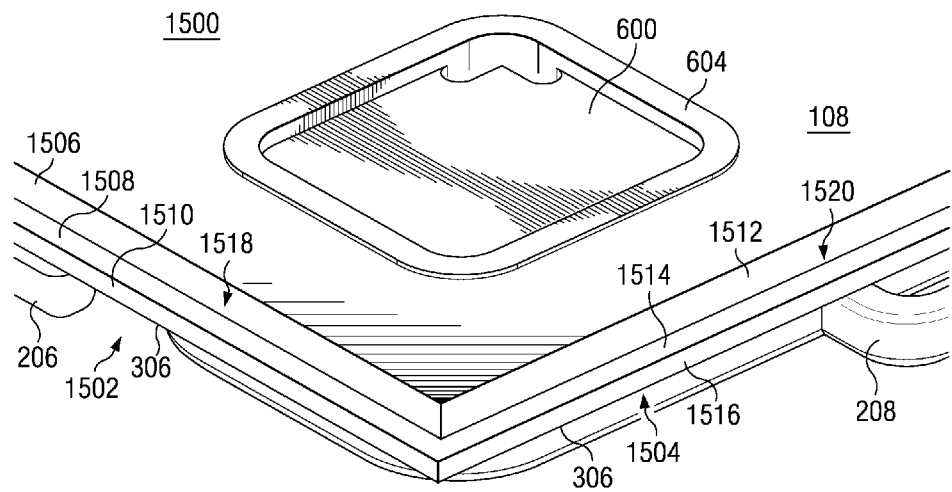
FIG. 15 is an isometric magnified detail view of a corner of a tile body according to a second embodiment of the invention, prior to overmolding a peripheral seal thereon.

FIGS. 15-18 illustrate an embodiment of the invention in which the overmolded structure includes a peripheral seal that is used to seal to adjoining tiles when a floor surface is assembled. FIG. 15 is an isometric view of a floor tile body 1500 that is similar to body 104 (FIG. 2) but with lateral edges 1502, 1504 that are stepped rather than orthogonal to the web 200 and planar. This view is taken after molding the first polymer compound but prior to overmolding. In this illustrated embodiment, stepped lateral edge 1502 has a laterally inwardly disposed vertical surface 1506 which extends downwardly from general upper surface 108 to a horizontal shelf 1508. The horizontal shelf extends laterally outwardly from vertical surface 1506 to a second, laterally outwardly disposed vertical surface 1510. Vertical surface 1510 extends from the shelf 1508 to the lower surface 306 of the tile body 1500.

In the illustrated embodiment a lateral edge 1504 is similar in form to lateral edge 1502. A first, laterally inwardly disposed vertical surface 1512 extends from general upper surface 108 of the tile body 1500 to a shelf 1514. The shelf 1514 extends laterally outwardly from the vertical surface 1512 to a second, laterally outwardly disposed vertical surface 1516. The vertical surface 1516 extends from the shelf 1514 to the general lower surface 306 of the tile body 1500. Surfaces 1506, 1508 and 1510 define a recess (more particularly, a step) 1518 which can be subsequently occupied by an overmolded peripheral seal. Similarly, surfaces 1512, 1514 and 1516 define a step 1520 which can be subsequently occupied by an overmolded peripheral seal, preferably continuous with the seal occupying step 1518. While this illustrated embodiment uses steps 1518, 1520 as locations which can be occupied by a peripheral seal, other profiles are possible, such as curved or keyed profiles and/or ones which include a physical interference to the delamination of the peripheral seal from the body 1500. As before, it is preferred to mold the body 1500 from a relatively strong and rigid polymer compound such as one comprising polypropylene.

Figure 16:
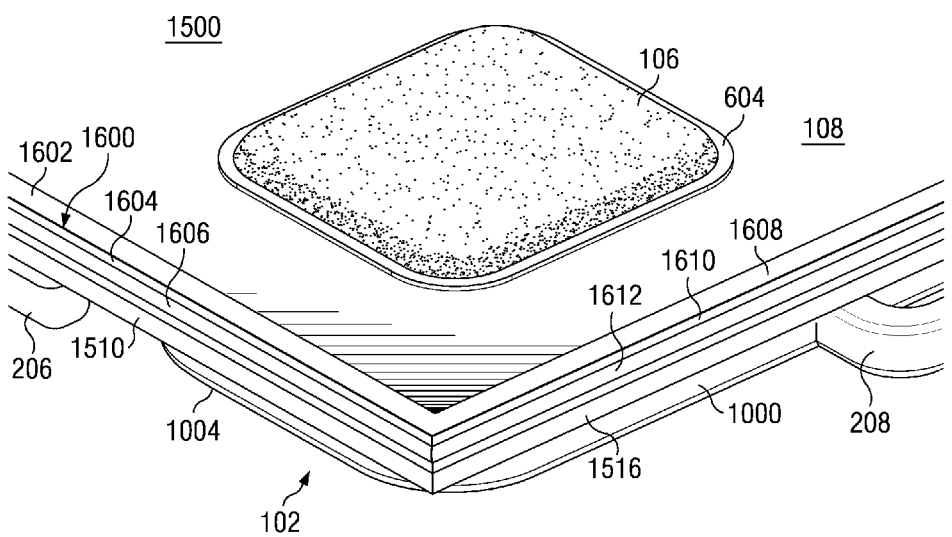
FIG. 16 is the tile body corner seen in FIG. 15, after overmolding.
Figure 17:
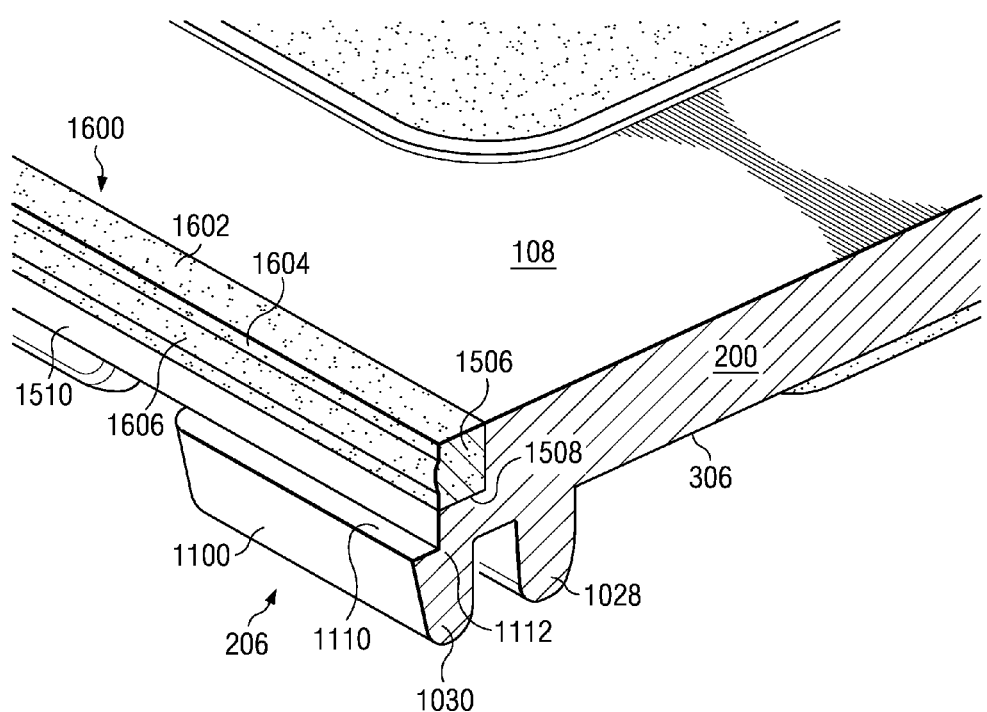
FIG. 17 is a magnified sectional detail through a lateral edge of the tile illustrated in FIG. 16.

FIG. 16 shows the view shown in FIG. 15, but after at least one overmolding step in which a peripheral seal 1600 has been overmolded into the steps 1518, 1520 to laterally surround the body 1500. The creation of the seal 1600 can take place during, before, or after the creation of the raised pads 106 and skins 304 (FIG. 9), and the seal 1600 can be constituted by a polymer compound which is the same as or which is different from the polymer compound constituting pads 106 and skins 304, in terms of composition, hardness, and/or color. It is preferred that the seal 1600 be constituted by a compound comprising SEBS TPE or other elastomeric compound.

A top surface 1602 of the seal 1600 is preferred to be coplanar with the general surface 108 of the body 1500. On one side of the tile body 1500, the horizontal surface 1602 extends from vertical surface 1506 laterally outwardly to a vertical surface 1604 of the seal. The vertical surface 1604 of the seal extends from seal horizontal surface 1602 until it meets with vertical surface 1510 of the body 1500, with which it is coplanar. As better seen in FIG. 17, the otherwise planar vertical surface 1604 is interrupted by a bump 1606 which is convex in section.

On an adjacent side of the body 1500, a horizontal surface 1608, which is continuous with the surface 1602 and preferably coplanar with upper surface 108 of body 1500, extends laterally outwardly from the lateral edge of vertical surface 1512 to a vertical surface 1610 of the seal 1600. The vertical surface 1610, which in general is orthogonal to surface 108 and planar, is interrupted by a convex bump 1612. Otherwise, surface 1610 meets and is coplanar with vertical surface 1516 of the body 1500. Surfaces 1604, 1610 form a ninety degree corner at their junction.

Figure 18:
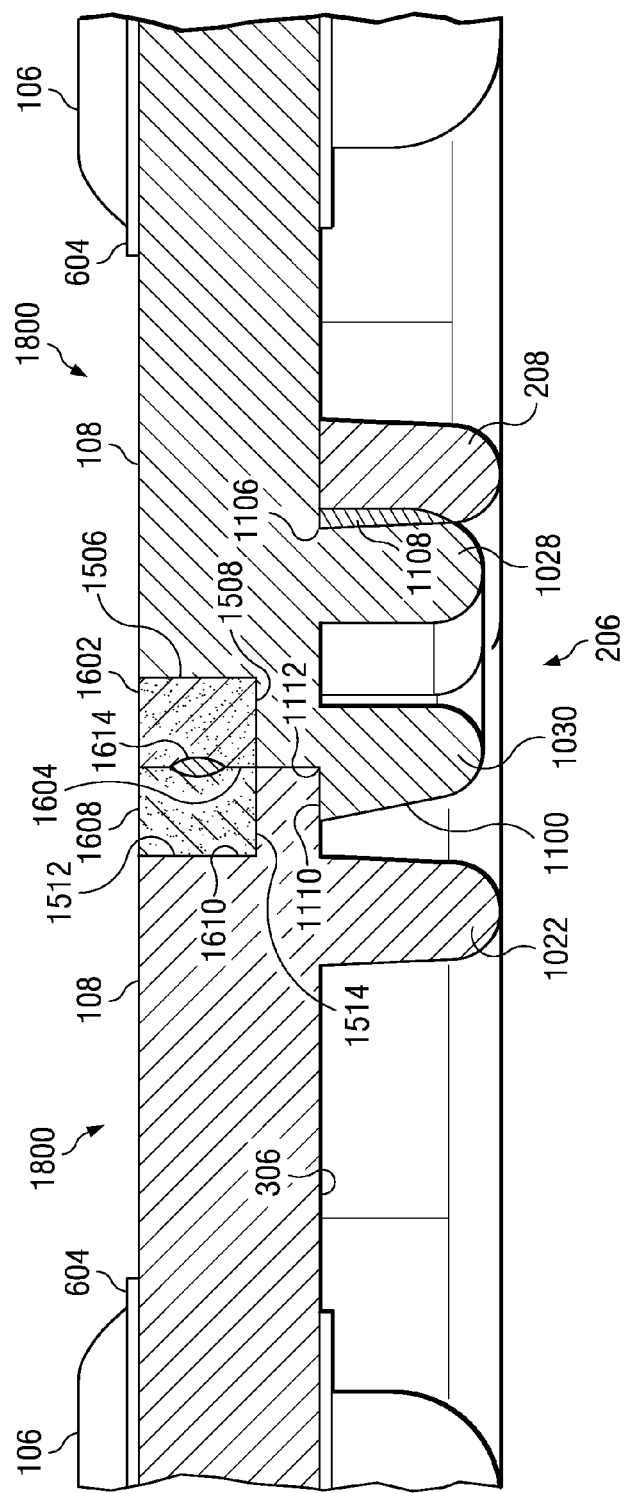
FIG. 18 is a magnified sectional detail showing joined lateral edges of adjacent tile, taken through two cooperating peripheral seals.

As shown in FIG. 18, when adjacent tiles 1800 are assembled such that a latch 206 is inserted into a loop 208, the bumps 1606, 1612 are in interference with each other, as shown by hatched interference region 1614. This creates a substantially watertight peripheral seal of each tile to the other tiles in the floor surface.

Figure 19:
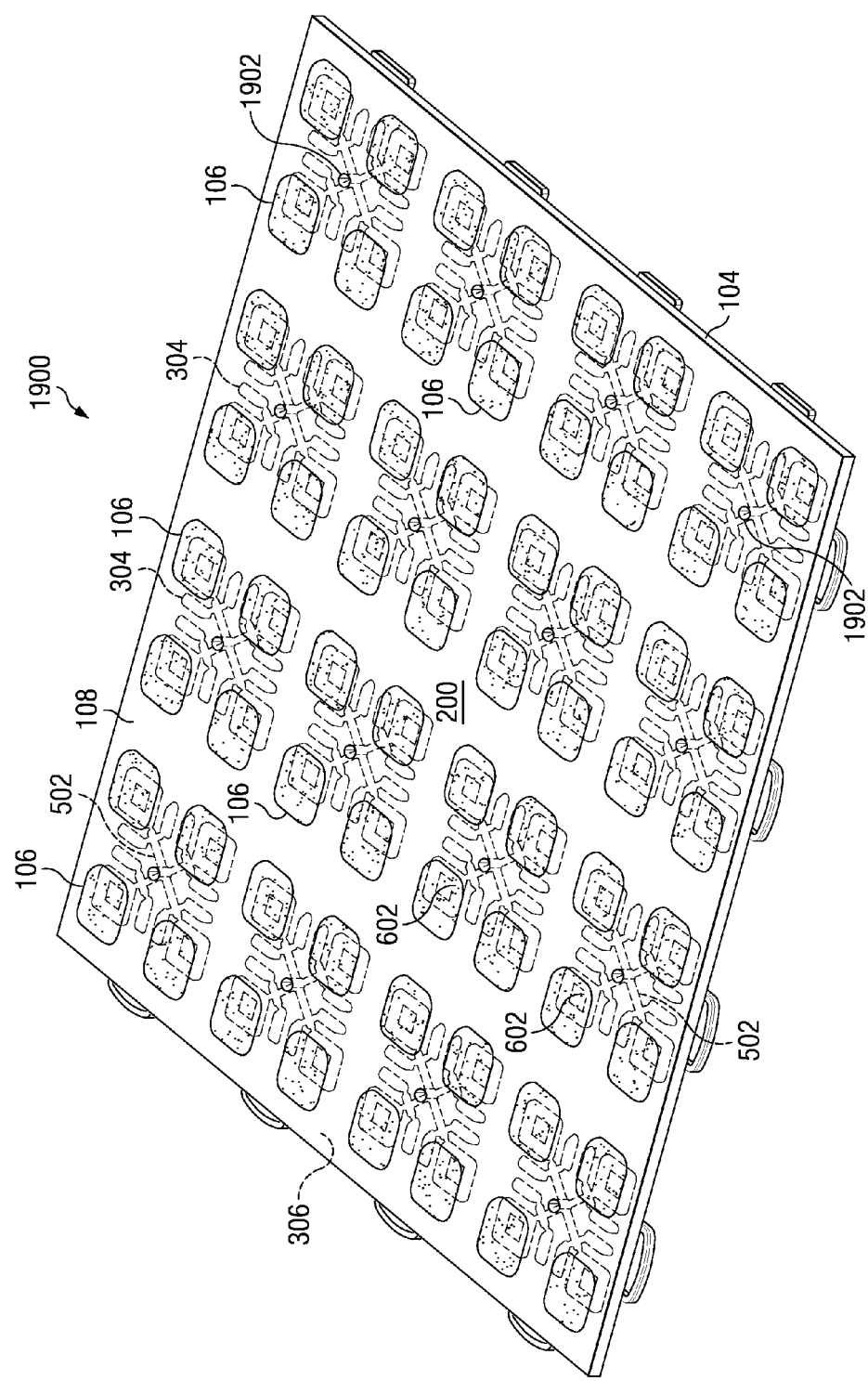
FIG. 19 is a schematic isometric view of a tile according to a third embodiment of the invention, wherein a second polymer compound is injected into a gate on an upper surface of the tile.

A further embodiment of the invention is shown in FIG. 19, in which certain structure adjacent the lower surface 306 of a tile 1900 is shown in phantom. This embodiment is similar to that shown in FIG. 2, with the difference that the second shot of polymer compound is introduced at upper surface 108 of the body 104, rather than at lower surface 306 thereof. For each of a group 300 of pads 106 and skins 304, a gate 1902 is formed to extend from the upper surface 108 of body 104 to the lower surface 306 thereof. The gate 1902 is continuous with runners 502 on the lower surface, which in turn communicate with the skins 304, the through-holes 602 and the cavities 600 in which are molded the pads 106. In making the second-shot injection, the second polymer compound flows through the gates 1902 to the lower surface 306, thence through runners 502 to the skins 304 and the through-holes 602, and finally back through the body 104 to the cavities 600 to mold the pads 106. In an alternative embodiment, the pads 106 are omitted and only structure adjacent lower surface 306 is molded, except for dots on the upper surface that result from the gates 1902.

Figure 20:
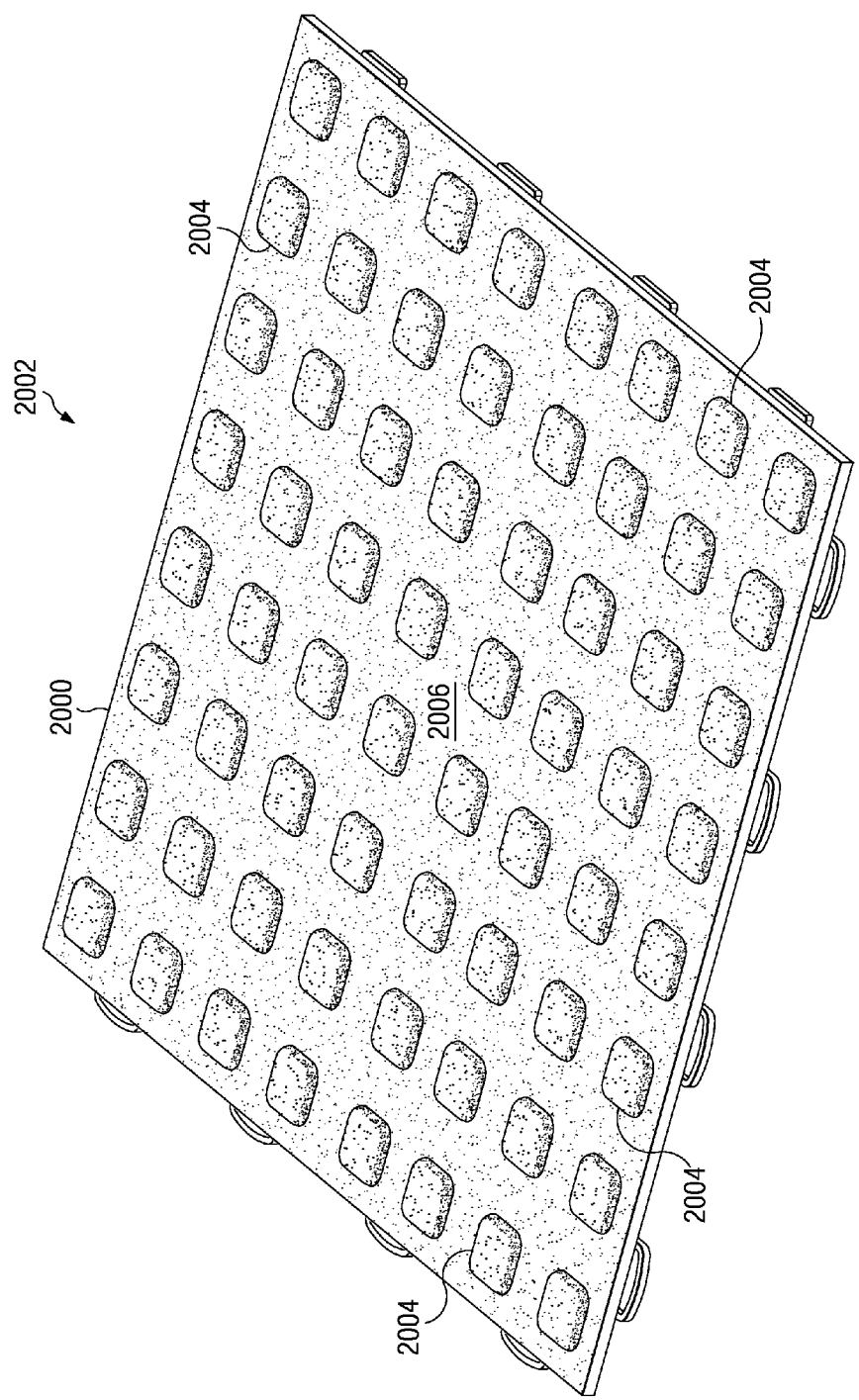
FIG. 20 is a top isometric view of a modular floor tile according to a fourth embodiment of the invention.

It is possible to overmold certain features on the bottom surface of the tile without creating raised pads from the second polymer compound on the top surface thereof. A top surface of such an embodiment can be seen in FIG. 20, in which the entire top surface 2000 of a tile 2002 is molded of the first polymer compound. While the top surface 2000 can be featureless except for texturing, in this illustrated embodiment an array of features 2004, which can be rounded squares or which can take any other desired shape, are upstanding from a general top surface 2006. A bottom surface of this illustrated embodiment can be exactly as it appears in FIGS. 3, 5, 10, 12 and 13. In this embodiment there are no through-holes or gates between the upper and lower surfaces of the tile 2002. This embodiment and the embodiment shown in FIGS. 1-13 can be made using much the same molding apparatus, by swapping out a cavity-side mold insert adjacent the top surface 108, 2000 and leaving a core side (adjacent the lower surface) alone. This illustrated embodiment will still exhibit non-slip properties relative to the substrate on which it is placed, may have better chemical and wear resistance, and may cost less to produce.

Considering together the embodiment illustrated by the combination of FIGS. 3, 5, 10, 12, 13 and 20, raised features 2004 are more likely to receive a disproportionate amount of weight from a vehicle or other heavy object superimposed on the tile 2002. It is therefore preferred that some of the support members, such as members 800 (FIG. 8), receive all or some of the columnar load placed on any raised feature 2004. In the illustrated embodiment, each annular support member 800 (see FIG. 8) is in approximate registration with a respective raised feature 2004 and as such will militate against shearing between the boundary of the raised feature 2004 and the surrounding general surface 2006.

Figure 21:
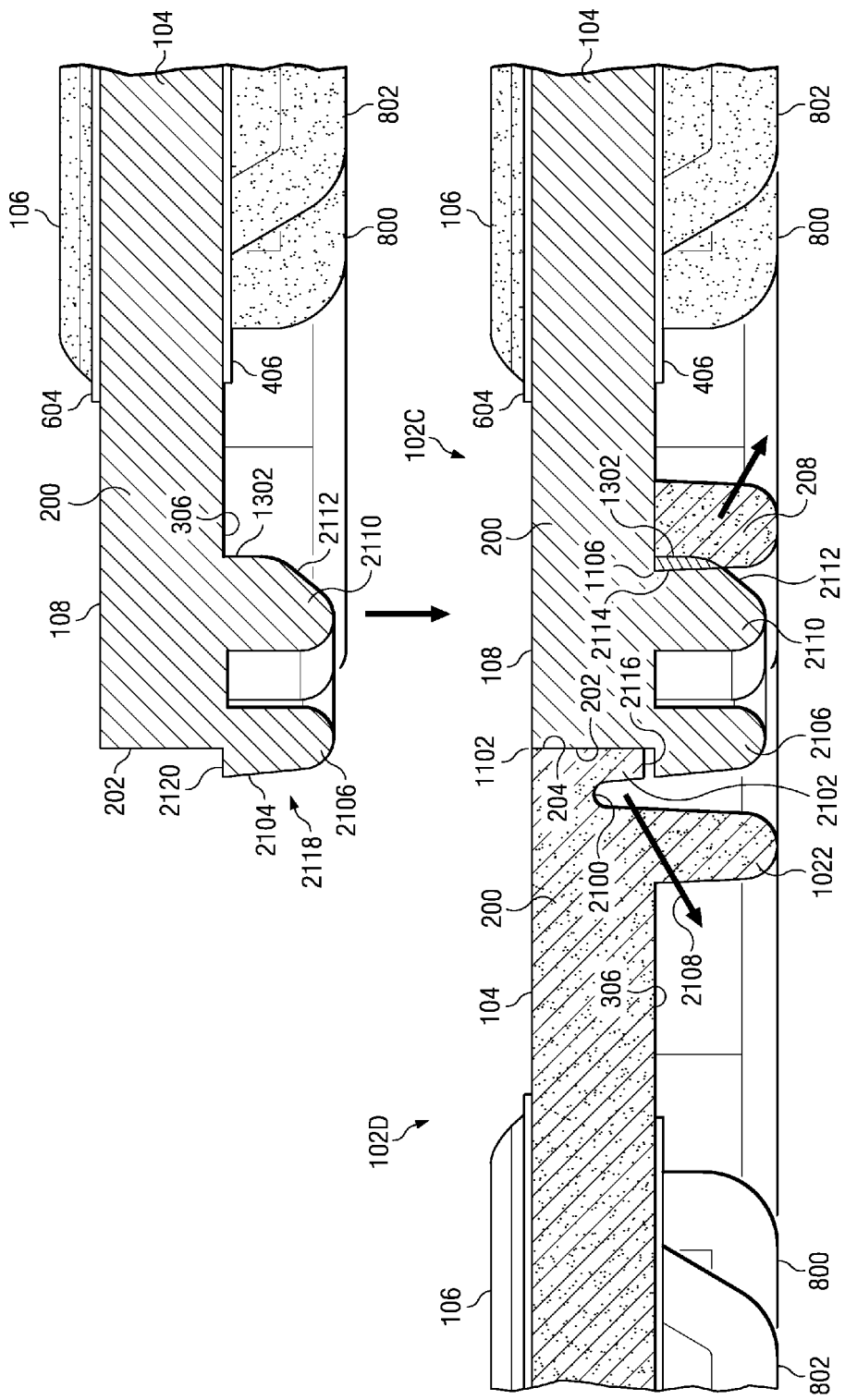
FIG. 21 is a magnified sectional view of two tiles according to a fifth embodiment of the invention.
Figure 22:
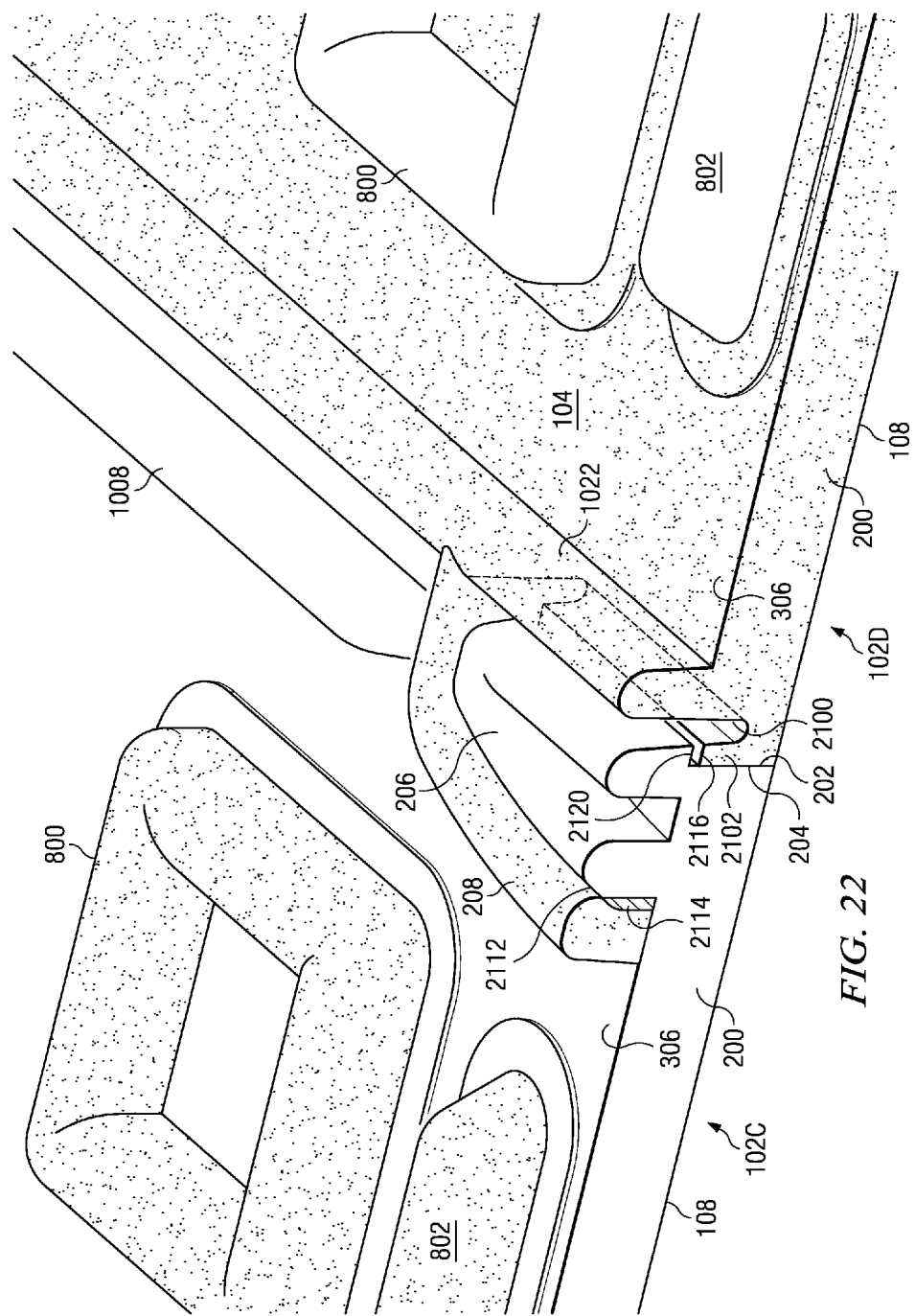
FIG. 22 is a magnified sectional view of the two tiles shown in FIG. 21, taken through cooperating latch and loop structure.

FIGS. 21 and 22 show a fifth embodiment of the invention in which modifications to the latch and loop structure have been made. In this embodiment an undercut or trench 2100 is made behind (laterally inwardly from) the lateral edge 204, but laterally outwardly from the rib segment 1022, to approximately fifty percent of the thickness of web 200. The undercut 2100 extends in parallel to edge 204 for the interior length of the wall segment 1022 between its attachment points (1024, 1026; FIG. 10) with female loop 208. The undercut 2100 leaves a downwardly depending flange 2102 which, when surface 2104 of outer wall 2106 slides vertically downward along surface 204, will flex inward (to the left in this picture) in approximately the direction of arrow 2108. The depth of the undercut 2100 is chosen to get a sufficient flexure of the flange 2102 upon snapping the tiles together, and may be more or less deep than shown depending on the flexural modulus of the polymer used to mold tile body 104. Flexing flange 2102 permits latch 206 to more easily snap into loop 208 and places less stress on loop 208 while joining two adjacent tiles. The inner latch wall 2110 may be made thicker and preferentially has a preferably flattened, inner ramped surface 2112 which cams against corner 1106 as the right tile 102C is pressed downward to join it with left tile 102D, until ledge 2120 clears lower edge 2116 of flange 2102. Ramped surface 2112 preferably extends downwardly and laterally outwardly from innermost limit 1302 of latch 2118. After the tiles 102C, D are snapped together, there will remain a hatched interference region 2114 between inner latch wall 2110 and outer female loop 208, keeping the tiles 102C, 102D biased together or in compression with each other; the physical position of loop 208 will actually be displaced rightward from that shown in FIG. 21.

Preferably a lower edge 2116 of the flange 2102 is slightly relieved (or upwardly displaced) from the plane of the general lower surface 306. This permits an easier overdrive of male latch 2118 into female loop 208 and better assures an audible click when horizontal ledge 2120 snaps beyond lower edge 2116.

Figure 23:
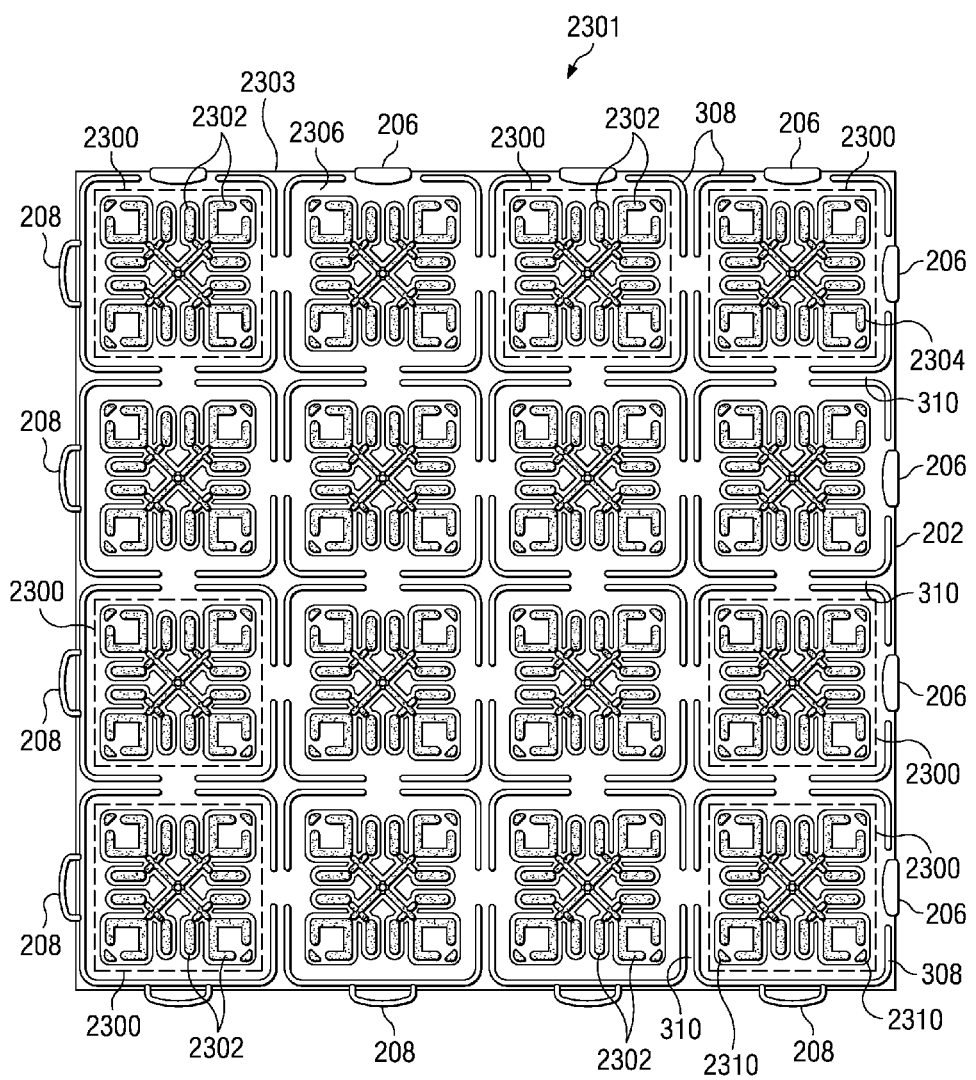
FIG. 23 is a back view of a modular floor tile according to another embodiment.

FIGS. 23 through 27 show another embodiment of the invention. In this embodiment, the bottom view of a tile 2301, shown in FIG. 23, shows sixteen groups 2300 of support members 2302. The body 2303 may be molded from a first polymer compound and have an upper surface 2602 (see FIG. 26) and a general lower surface 2306. One or more upper features 106 (FIG. 2), such as pads, may be formed or overmolded into the upper surface 2602 with a second polymer compound. As completed, the upper features or pads 106 on upper surface 2602 (FIG. 26) may look identical to the ones of embodiments previously described herein. One or more lower features 2302 (FIG. 23), such as support members or skins, may be overmolded onto the lower surface 2306 of the body 2303 from the second polymer compound. As above, the second polymer compound preferably has a higher coefficient of friction than the first polymer compound so that the upper features 106 and the lower features 2302, or skins, act as nonslip surfaces. Alternatively or additionally, they may be made in a color different from that of the tile body 2303.

Figure 24:
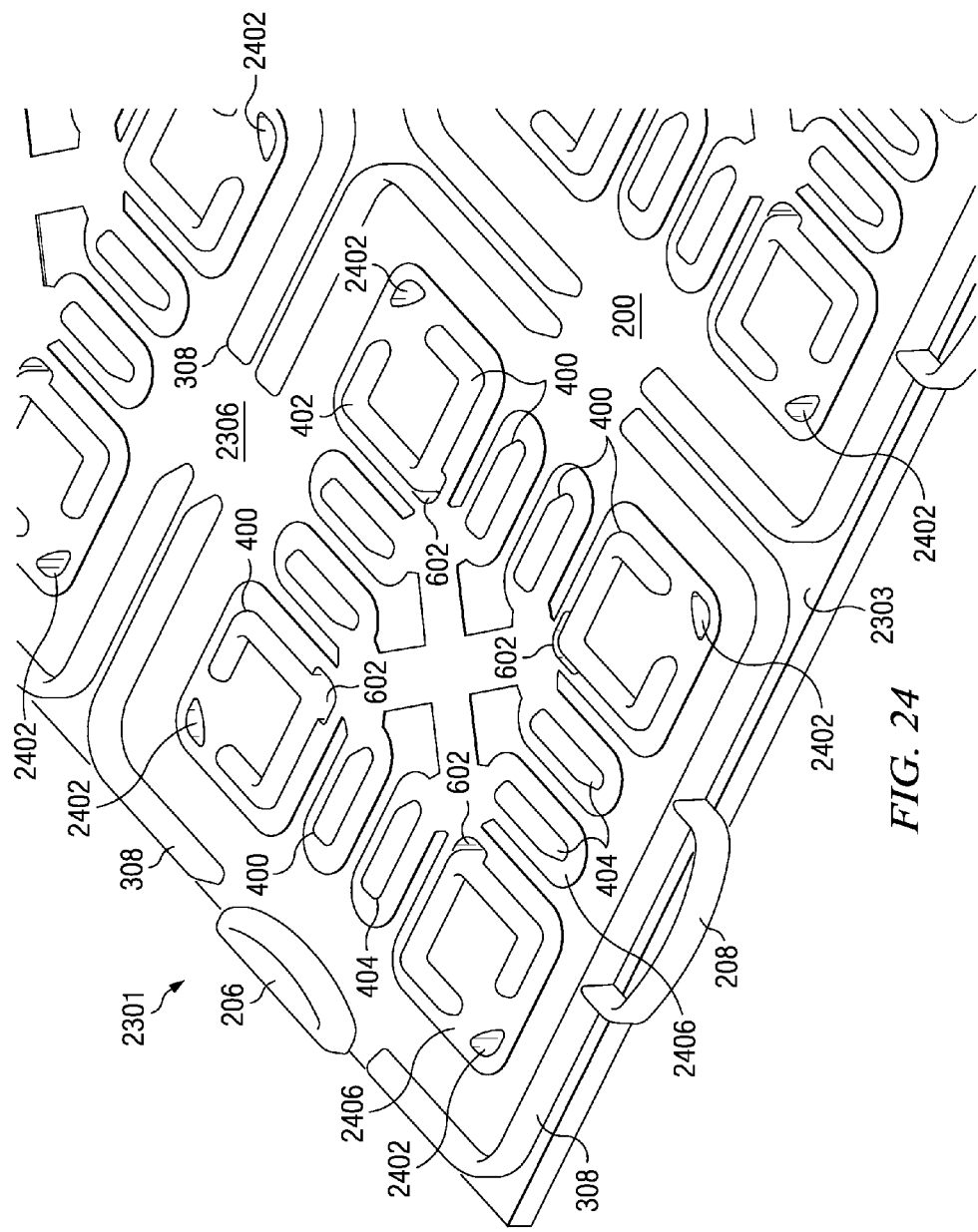
FIG. 24 is an isometric detail of the back of the floor tile shown in FIG. 23, illustrating the tile body prior to overmolding with a second polymer compound.
Figure 25:
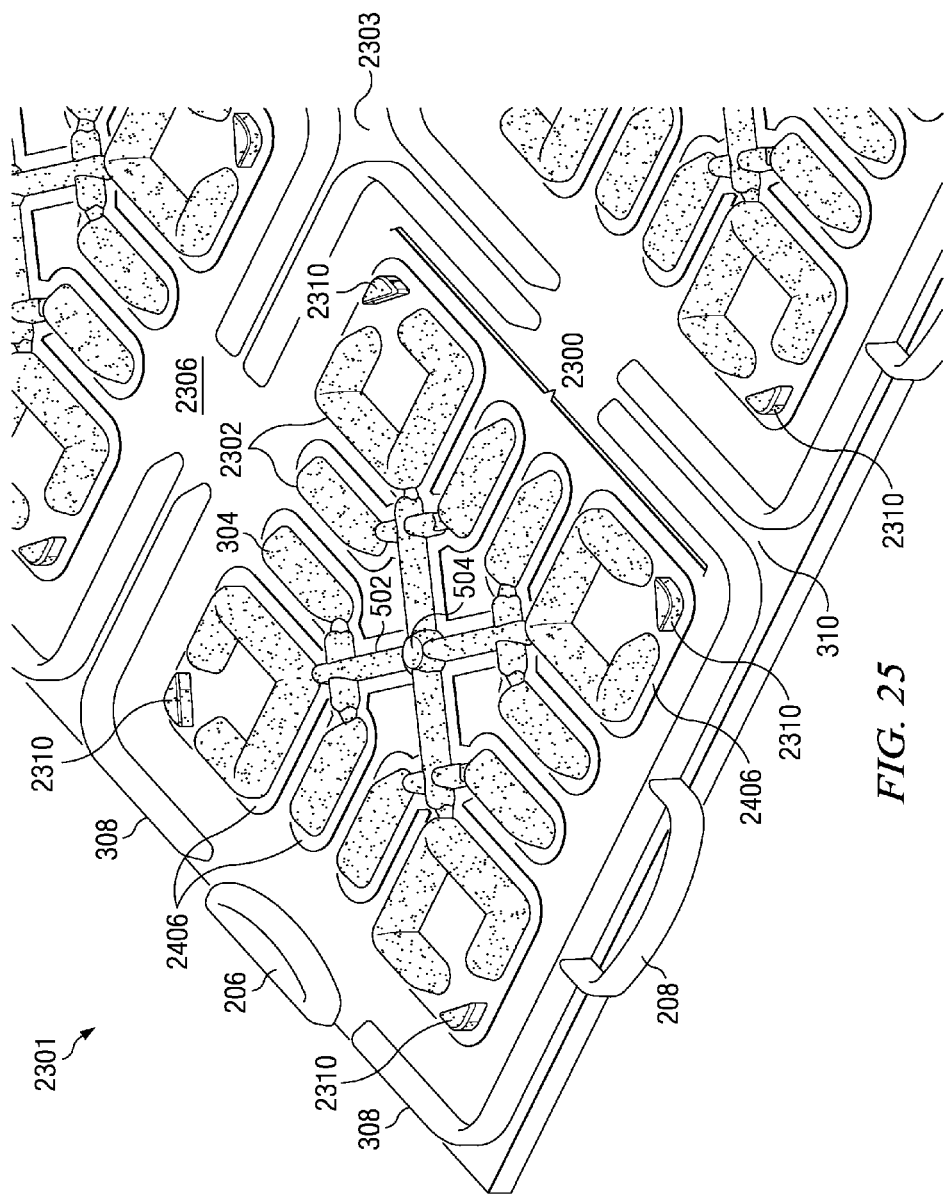
FIG. 25 is an isometric detail of the same tile region shown in FIG. 24, shown after overmolding has been completed.

FIGS. 24 and 25 show the details of the tile lower surface 2306. Specifically, these FIGURES show a single group 2300 of support members 2302 before (FIG. 24) and after (FIG. 25) the second polymer compound is overmolded onto the body 2303 of the tile 2301. FIG. 24 shows there can be seen a plurality of support member cores 400 which depend downwardly (in this view, extending toward the top of the paper) from the general lower surface 2306 of the substantially horizontal web 200 that makes up most of the tile body 2303. One or more through-holes 602 connect the upper surface 2602 (see FIG. 26) with the lower surface 2306. Similarly, one or more vent holes 2402 connect the upper surface 2602 with the lower surface 2306 of the tile 2301. Preferably, each vent hole 2402 is in a location that is laterally interior to and within a periphery of a respective upper feature 106. Each upper feature 106 has a through-hole 602 and a vent hole 2402 communicating to it and these are laterally spaced from each other. Preferably the vent hole 2402 for any particular pad 106 should be positioned at a location that is farthest from the through-hole 602 therefor, while still being laterally within the periphery of the cavity that will form the pad or upper feature 106.

Figure 26:
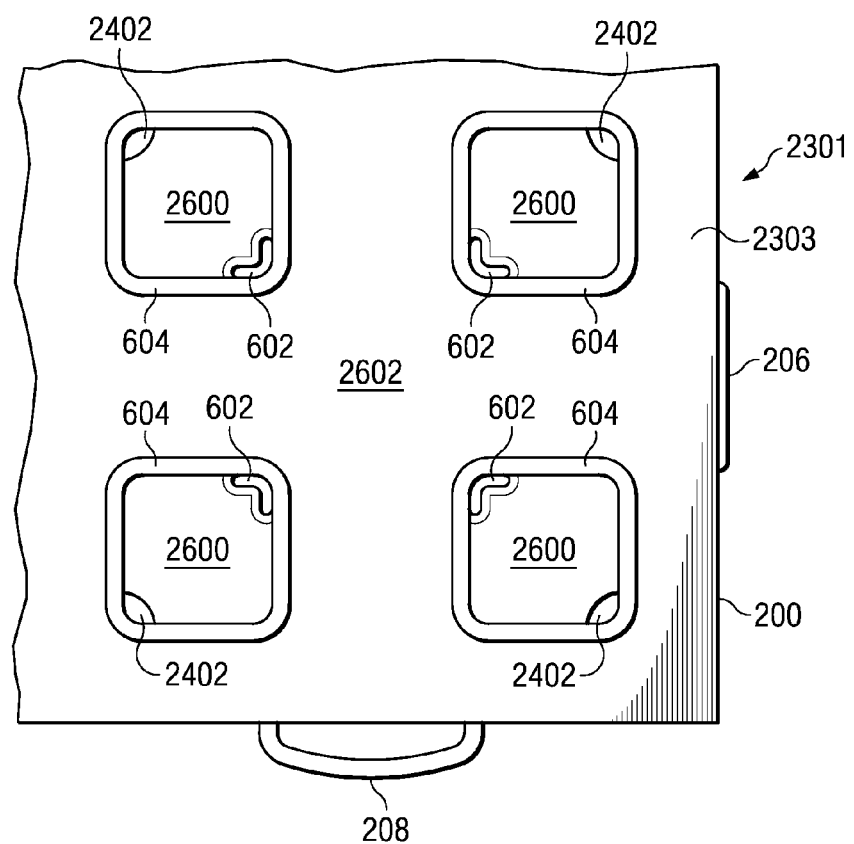
FIG. 26 is a detail of the upper surface of the tile shown in FIG. 23 prior to overmolding, showing through-holes, vent holes, and crush rings.

FIG. 26 shows the details of an area on the top of tile 2301, prior to overmolding. Each overmolded pad 106 (see FIG. 7) may reside in a shallow recess or receptacle 2600 whose surface is lower than that of the general upper surface 2602. For each recess 2600, there is provided at least one through-hole 602 and at least one vent hole 2402, each of which communicates the top surface of the tile web 200 to a lower surface thereof. In the illustrated embodiment, the through-holes 602 and vent holes 2402 make up a small fraction (about 5% each) of the bottom of the recesses 2600. Each of the recesses 2600 form respective lower portions of the cavities in which upper features or pads 106 will be formed, the remainder of the surfaces thereof being constituted by the other mold half. Limiting the size of through-holes 602 and vent holes 2402 enhances the structural integrity of the tile 2301. However, in alternative embodiments, the size and/or number of the through-holes 602, and even vent holes 2402, may be increased to accommodate more highly viscous second-shot polymer compounds.

The recesses 2600 are each laterally surrounded by a crush ring 604. See FIG. 26. Each crush ring 604 is finished to be smooth (in contrast, the general upper surface 2602 of the body 2303 can be textured) and can be slightly raised relative to the general upper surface 2602. The crush rings 604 each adjoin the periphery of a respective upper feature 106 and provide a tight overmold shutoff that prevents the flashing of the second polymer compound outside the confines of the crush rings 604. FIG. 25 further shows that a portion 2310 of at least one upper feature, or pad, 106 (see FIG. 7) may extend through the vent hole 2402 below the general lower surface 2306. As shown in FIGS. 23 and 25, the portion 2310 extending through the vent hole 2402 may be discontinuous with or spaced from the second polymer compound of the lower support member 2302. As described in more detail below, this spacing may be accomplished by providing a portion of the crush pad 2406 between the vent hole 2402 and the cores 400.

The crush pad 2406 is formed into the body 2303 in a manner similar to the crush ring 604 to be slightly lower than the general surface 2306 (in this bottom view, is slightly raised relative to general surface 2306). The crush pad 2406 is formed to be closely adjacent all of the support member cores 400 and to laterally surround all of the cores 400, the runners 502 connecting the lower features 304, the through-holes 602, and the vent holes 2402 (and therefore portions 2310). The crush pad 406 is finished to have a smooth surface and is used as a shutoff surface that prevents the flashing of the second polymer compound during a "second shot" or overmolding step of fabrication.

In an arrangement similar to that illustrated and described previously (see FIG. 19), a gate 1902 is disposed to be adjacent to the lower surface 2306 and remote from the upper surface 2602. The gate 1902 communicates with the upper feature 106 through common fill point 504 and a through-hole 602 that extends from the lower surface 2306 to the upper surface 2602. The gate 1902 is in direct communication with each lower feature 2302 by a path which does not pass through the body 2303.

FIG. 25 shows the same area after overmolding. The second polymer compound now appears on the bottom surfaces and sides of each of the cores 400 as a lower feature 2302 or skin. While the second polymer skin could be overmolded separately on each core 400, in the illustrated embodiment, the second polymer within the support member group 2300 is part of a continuous phase. The second polymer preferably does not extend to regions outside of, and is contained by, the crush pads 2406.

Figure 27:
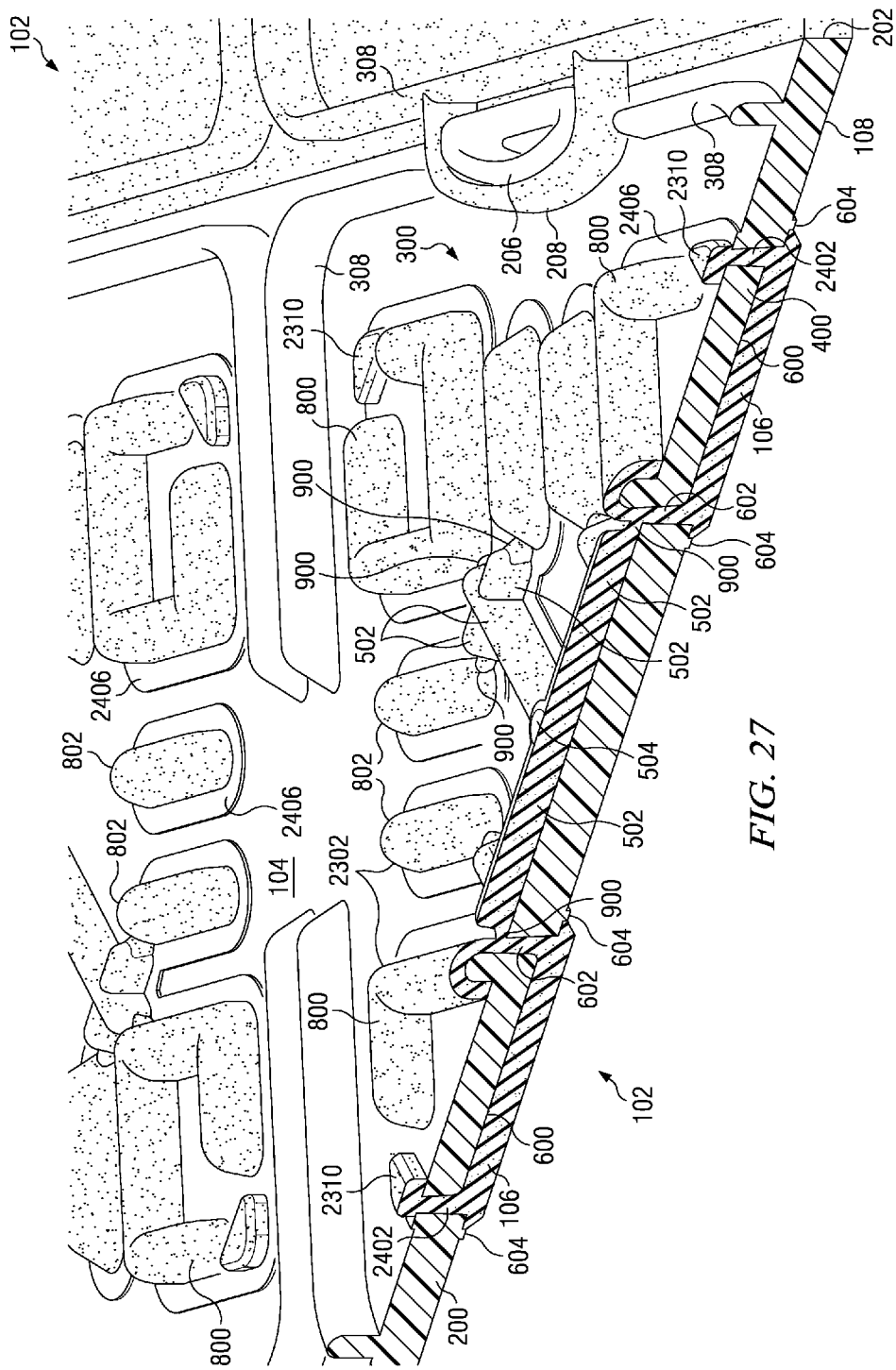
FIG. 27 is a magnified sectional detail of the tile shown in FIG. 23, showing the relationship of the overmolded features on the tile's upper and lower surfaces.

FIG. 27 shows that a plurality of upper features 106 and lower features 800, 802 can be formed from one gate 1902 (FIG. 19). It can be seen that the molten second polymer flows from the gate 1902 (see FIG. 19) to the common fill point 504 and directly to the lower surface 2306 to form the lower features 800, 802. This path does not go through the first-shot tile body 2303. FIG. 27 also shows that each upper feature 106 is in communication with a respective vent hole 2402. The second polymer flows from the gate 1902, to the common fill point 504, and through the through-hole 602 to form a respective upper feature 106. For each feature or pad 106, the second polymer flows from the through-hole 602 and flows into and fills a respective mold cavity formed in part by a recess 2600, and back through the vent hole 2402. In this way, any gas in the polymer flow-path is displaced, and defects or voids at the end-of-fill point in the overmolded upper feature 106 caused by trapped gas can be minimized or prevented. This trapped gas otherwise can cause burn marks, short shots, and/or poor adhesion of the upper features 106 to the body 2303.

The structure shown in FIG. 24 is one possible first-shot body structure that promotes the displacement of any gas out of the upper feature cavity. Each core 400 may be interrupted or truncated to provide lateral separation from the vent hole 2402, which is preferably placed at a position farthest away from the through-hole. Where, as here, the upper feature 106 takes on a roughly square or rectangular shape, the through-hole 602 and the vent hole 2402 can be disposed in opposite corners of the upper feature. The positioning of vent hole 2402 preferably should be such that the molten second-shot polymer flowing from the through-hole 602 will reach the vent hole 2402 only after reaching the rest of the cavity defined in part by recess 2600. After molding (FIG. 25), the separation between core skin 2302 and portion 2310 is maintained by the crush pad 2406, which seals the portion 2310 of the upper feature 106 or pad extending through the vent hole 2402 from the lower features 2302 or skins molded onto the cores 400. This separation of the top flow (through the through-hole 602, over the recessed area 2600, and through the vent hole 2402) and the bottom flow (from the common fill point 504, to the runner 502, to the lower feature 2302 or skin) prevents the top and bottom flows from interfering with one another in correctly filling the volumes into which the second polymer is to be overmolded.

Figure 28:
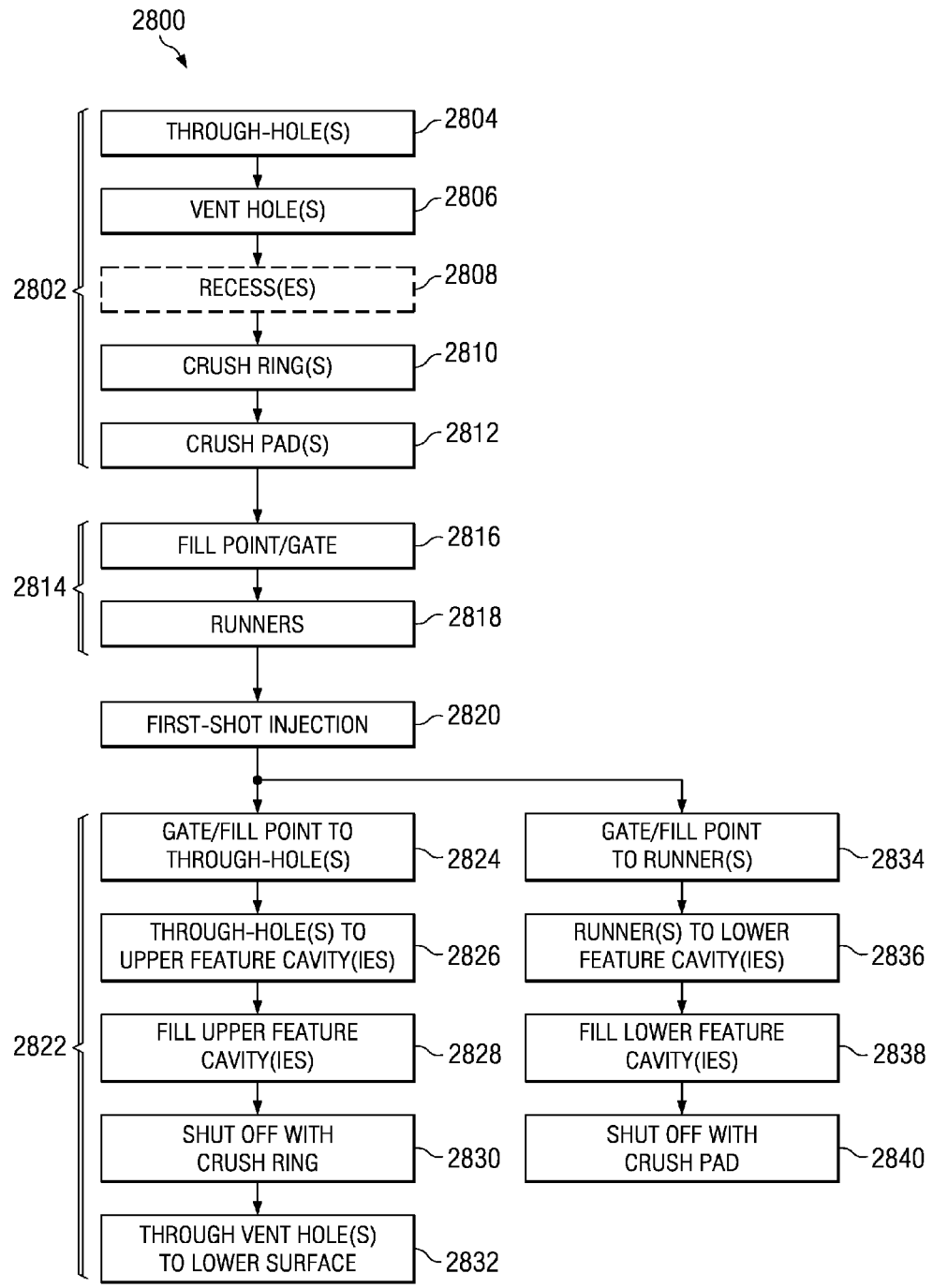
FIG. 28 is a schematic flow diagram illustrating steps in an alternative manufacturing process according to the invention.

FIG. 28 illustrates a method 2800 of manufacturing a modular floor tile 2301 according to the invention. At 2802, the first-shot injection mold is formed, including forming (2804) structures which will make one or more through-holes 602, and forming (2806) one or more vent holes 2402. Optionally structures which will form one or more recesses 2600 can be formed at step 2808, the recesses 2600 then acting as portions of the cavities in which the upper features or pads 106 will be later molded. At step 2810, structure defining the crush ring(s) 604 are formed on the upper surface 2602 of the first-shot body 2303, so as to laterally surround each upper feature and preferably to be elevated above the general upper surface. For each such upper feature, at least one through-hole and at least one vent hole is made, and these preferably are spaced to be at opposite ends of the upper features to which they communicate. At step 2812, crush pad(s) 2406 are defined on the lower surface 2306 of first-shot body 2303, so as to laterally surround each lower feature to be molded in the second shot, and also to laterally surround each vent hole 2402.

At step 2814, the second-shot mold half is created. The structures formed in this step include a common fill point 504, which is located to be adjacent the lower surface 2306 of the first-shot body 2303 and remote from the upper surface 2602 thereof. Cavities for the second-shot runners 502 (FIG. 27) are also formed at this step.

The first polymer compound is injected into the first-shot injection mold at step 2820; this will form a first-shot tile body 2303 as seen in FIGS. 24 and 26.

The second polymer compound is injected into a second-shot injection mold at step 2822, to overmold upper features 106, and preferably also lower features 800, 802, onto the respective upper and lower surfaces of the tile body. The second polymer compound is introduced (2824) to the mold at a gate 1902 and common fill point 504, for each connected group of upper and lower features. In one embodiment, there are 16 such gates and fill points on one tile. The second polymer flows by runners 502 to the through-hole(s) at step 2824. At step 2826, the second polymer flows in each connected through-hole 602 from the lower surface to the upper surface, reaching the cavity(ies) which each define respective upper feature(s). The upper feature cavity(ies) are filled at step 2828. At step 2830, the crush ring(s) shut off the second polymer compound from flashing across the upper surface of the part. The second polymer compound pushes any gas through vent hole(s) 2402, minimizing or obviating any defects in the upper feature(s). To positively assure that this is accomplished, at step 2832 second polymer compound may flow through each vent hole 2402 to protrude onto the lower surface 2306. The crush pad 2406 and associated mold half isolate this second polymer portion 2310 from next-adjacent lower features 800.

While the second polymer compound is molding the upper feature(s) at steps 2824-2832, it can also create lower feature(s) at steps 2834-2840. At step 2834, second polymer compound flows from gate 1902 and common fill point 504 into and through one or more runners 502. At step 2836, the runners 502 permit second polymer compound to reach each of the lower feature(s) 800, 802, where the cavity(ies) defining them are filled (2838). At step 2840, the crush pad(s) 2406, in conjunction with the mating second-shot mold half (not shown), shut off the molten second polymer compound, preventing the flash of same over the lower surface 2306. The mold half and crush pad(s) 2406 also isolate second polymer portion 2310 from the second polymer compound flowing in to form feature(s) 800, 802. In this way, there is no hydraulic interference between the molten polymer compound flowing into and forming the upper feature(s) and the molten polymer compound flowing into and forming the lower feature(s), and any air or inert gas will be expelled from the upper surface features.

While embodiments of the present invention have been described in the above detailed description and illustrated in the appended drawings, the present invention is not limited thereto but only by the scope and spirit of the appended claims.

We claim:

1. A method for forming a modular floor tile for use in creating a flooring surface comprising a plurality of such tiles, the method comprising the steps of:
    defining a body of the tile to have a general upper surface and a lower surface;
    defining, on the general upper surface of the body, a plurality of pads, each pad in the plurality of pads being spaced apart on the general surface of the body from the others in the plurality of pads;
    forming the body of the tile from a first thermoplastic polymer compound to have a plurality of spaced-apart through-holes, each through-hole communicating from a respective pad on the general upper surface of the body to the lower surface of the body, each through-hole having an area on the upper surface of the body which is smaller than an area of the respective pad on the upper surface of the body;
    overmolding, onto the general upper surface of the body, the plurality of pads from a second thermoplastic polymer compound which is different from the first thermoplastic polymer compound;
    said step of overmolding including the steps of injecting the second thermoplastic polymer compound into a mold at at least one common fill point adjacent the lower surface of the body and flowing the second thermoplastic polymer compound from said at least one common fill point along at least one runner that extends laterally from said at least one common fill point to the through-holes and through the through-holes to form the plurality of pads on the general upper surface of the body.

2. A method for forming a modular floor tile for use in creating a flooring surface comprising a plurality of such tiles, the tile having a body with a lower surface and a general upper surface on which are disposed a plurality of pads, the method comprising the steps of:
    molding the body of the tile from a first thermoplastic polymer compound;
    during said step of molding, forming, around each location at which one of the plurality of pads is to be molded, a crush ring to be elevated above the general upper surface;
    overmolding, onto the general upper surface, the plurality of pads from a second thermoplastic polymer compound which is different from the first thermoplastic polymer compound, the pads being spaced apart from each other on the general upper surface;
    said step of overmolding including the steps of injecting the second thermoplastic polymer compound into a mold at at least one common fill point adjacent the lower surface of the body and flowing the second thermoplastic polymer compound through each of a plurality of through-holes to form respective ones of said plurality of pads on the general upper surface, at least one runner extending laterally from said at least one common fill point and to join at least one of the plurality of through holes; and
    using the crush rings to shut off the second polymer compound in order to substantially prevent flashing of the second thermoplastic polymer compound.

* * * * *